(12) United States Patent
Sasaki

(10) Patent No.: US 6,826,012 B1
(45) Date of Patent: Nov. 30, 2004

(54) THIN-FILM MAGNETIC HEAD AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 485 days.

(21) Appl. No.: 09/592,297

(22) Filed: Jun. 12, 2000

(30) Foreign Application Priority Data

Jul. 8, 1999 (JP) .......................................... 11-193973
Jul. 23, 1999 (JP) .......................................... 11-209515

(51) Int. Cl.$^7$ .......................................... G11B 5/147
(52) U.S. Cl. .......................................... 360/126
(58) Field of Search ................................ 360/126, 123, 360/119, 317, 318, 319

(56) References Cited

U.S. PATENT DOCUMENTS

| | | | |
|---|---|---|---|
| 4,899,434 A | * 2/1990 | Roberts | 29/603.12 |
| 5,155,646 A | 10/1992 | Fujisawa et al. | |
| 5,438,747 A | 8/1995 | Krounbi et al. | 430/313 |
| 5,473,491 A | 12/1995 | Fujisawa et al. | |
| 5,793,578 A | * 8/1998 | Heim et al. | 360/126 |
| 6,016,290 A | * 1/2000 | Chen et al. | 369/13.17 |
| 6,130,809 A | * 10/2000 | Santini | 360/317 |
| 6,156,375 A | * 12/2000 | Hu et al. | 427/116 |
| 6,191,918 B1 | * 2/2001 | Clarke et al. | 360/126 |
| 6,259,585 B1 | * 7/2001 | Sasaki et al. | 360/317 |
| 6,325,947 B1 | * 12/2001 | Garfunkel et al. | 216/22 |
| 6,377,423 B2 | * 4/2002 | Dill et al. | 360/126 |
| 6,381,093 B2 | 4/2002 | Yoshida et al. | |
| 6,381,095 B1 | * 4/2002 | Sin et al. | 360/126 |
| 6,400,527 B1 | * 6/2002 | Gochou et al. | 360/126 |
| 6,452,742 B1 | * 9/2002 | Crue et al. | 360/126 |
| 6,477,007 B1 | * 11/2002 | Shukh et al. | 360/126 |
| 6,553,649 B1 | * 4/2003 | Santini | 29/603.14 |
| 6,557,242 B1 | * 5/2003 | Santini | 29/603.14 |
| 2002/0067570 A1 | 6/2002 | Sasaki et al. | |
| 2003/0193743 A1 | 10/2003 | Sasaki et al. | |

FOREIGN PATENT DOCUMENTS

| | | |
|---|---|---|
| JP | A-60-10409 | 1/1985 |
| JP | A-62-245509 | 10/1987 |
| JP | 3-100910 | 4/1991 |
| JP | 6-314413 | 11/1994 |
| JP | A-7-262519 | 10/1995 |
| JP | 8-180323 | 7/1996 |
| JP | 10-55516 | 2/1998 |
| JP | 11-167705 | 6/1999 |
| JP | 11-175916 | 7/1999 |

* cited by examiner

*Primary Examiner*—Angel Castro
(74) *Attorney, Agent, or Firm*—Oliff & Berridge, PLC

(57) ABSTRACT

A recording head has a bottom pole layer and a top pole layer that include pole portions, and a recording gap layer placed between the pole portions. The recording head further has a thin-film coil placed between the bottom and top pole layers, the coil being insulated from the pole layers. The bottom pole layer includes a first portion and a second portion. The first portion is located in a region facing toward the thin-film coil, an insulating layer being placed between the bottom pole layer and the coil. The second portion is connected to a surface of the first portion facing toward the thin-film coil. The second portion forms the pole portion and defines a throat height. The thin-film coil is located on a side of the second portion. Throat height TH is greater than MR height MR-H.

4 Claims, 20 Drawing Sheets

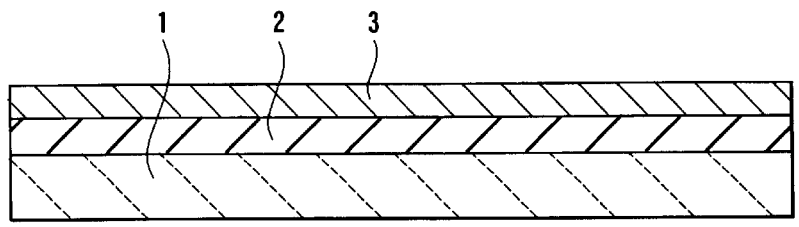
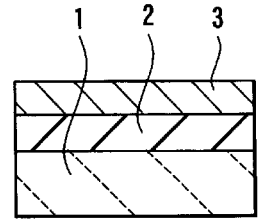
FIG. 1A  FIG. 1B
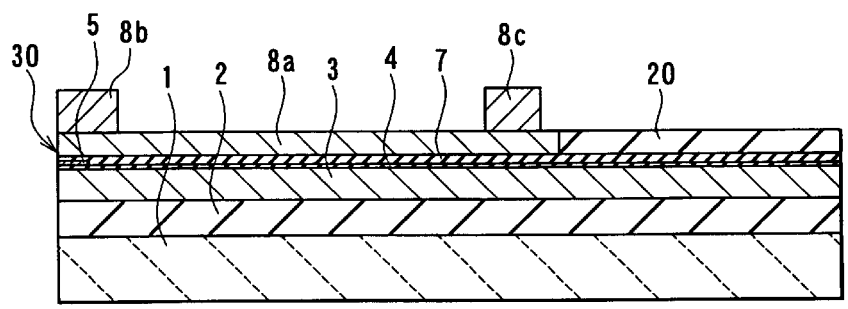
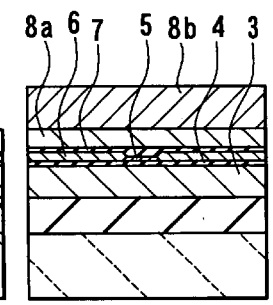
FIG. 2A  FIG. 2B
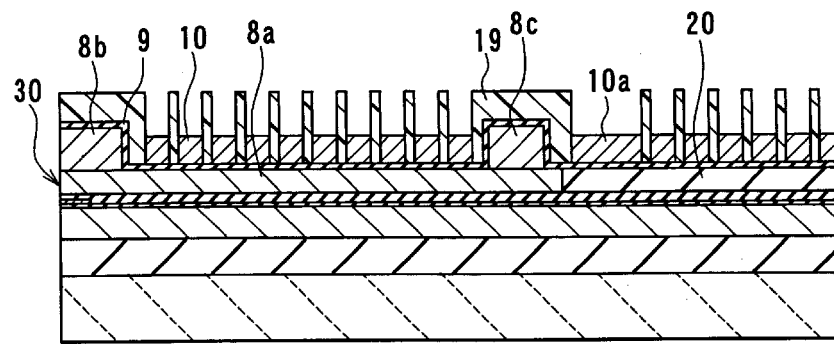
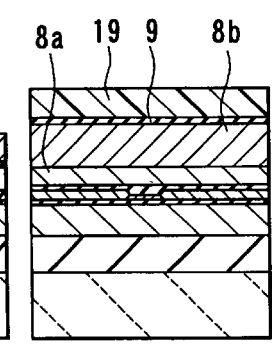
FIG. 3A  FIG. 3B

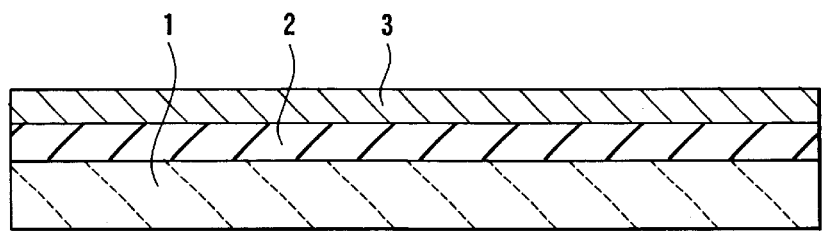 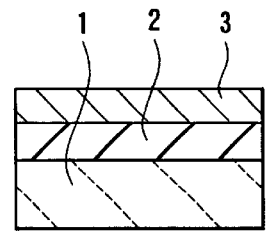
FIG. 14A   FIG. 14B
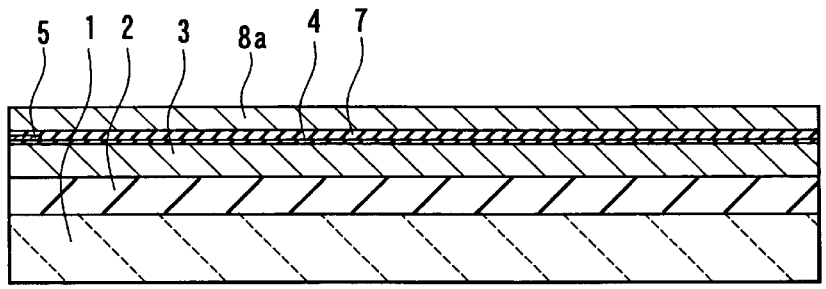 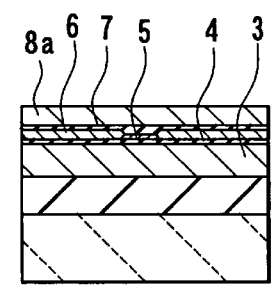
FIG. 15A   FIG. 15B
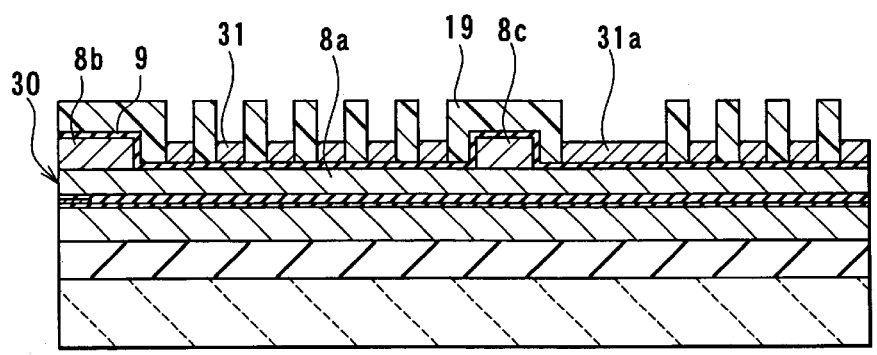 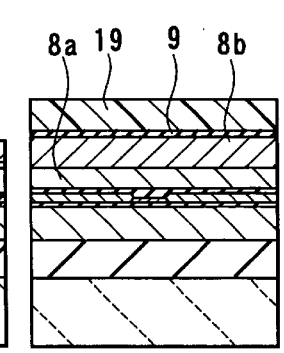
FIG. 16A   FIG. 16B

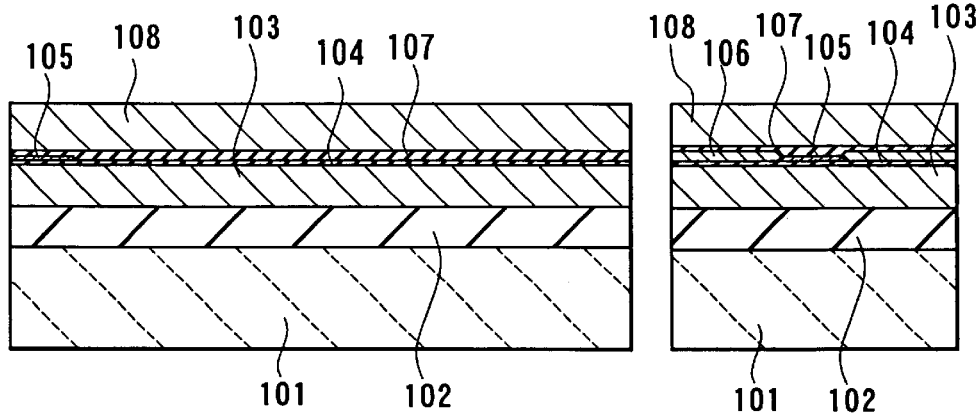
FIG. 23A
RELATED ART
FIG. 23B
RELATED ART
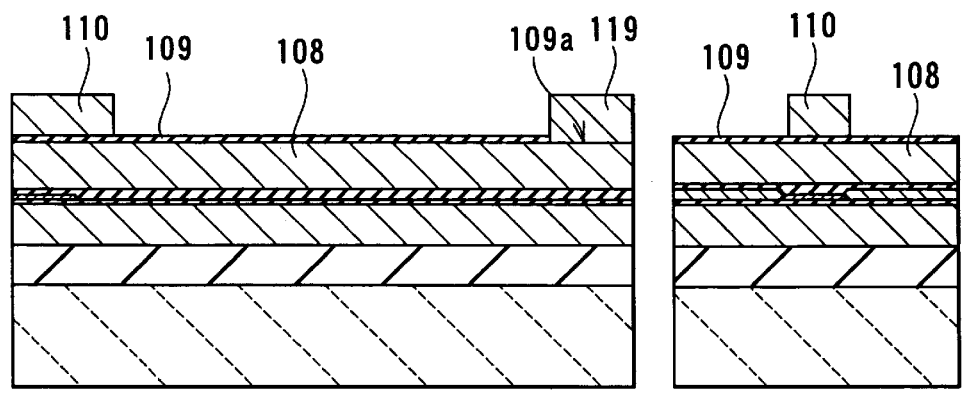
FIG. 24A
RELATED ART
FIG. 24B
RELATED ART

THIN-FILM MAGNETIC HEAD AND METHOD OF MANUFACTURING SAME

BACKGROUND OF THE INVENTION

1. Field of the Invention

The present invention relates to a composite thin-film magnetic head comprising a reproducing head and a recording head and to a method of manufacturing such a thin-film magnetic head.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein a track width, that is, the width of top and bottom poles sandwiching the recording gap layer on a side of the air bearing surface, is reduced down to microns or the submicron order. Semiconductor process techniques are utilized to implement such a structure.

Reference is now made to FIG. 23A to FIG. 26A and FIG. 23B to FIG. 26B to describe an example of a method of manufacturing a composite thin-film magnetic head as an example of a related-art method of manufacturing a thin-film magnetic head. FIG. 23A to FIG. 26A are cross sections each orthogonal to an air bearing surface of the thin-film magnetic head. FIG. 23B to FIG. 26B are cross sections of a pole portion of the head each parallel to the air bearing surface.

In the manufacturing method, as shown in FIG. 23A and FIG. 23B, an insulating layer 102 made of alumina ($Al_2O_3$), for example, having a thickness of about 5 to 10 μm is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 3 μm is formed. The bottom pole layer 108 is made of a magnetic material and used for both a reproducing head and a recording head.

Next, as shown in FIG. 24A and FIG. 24B, on the bottom pole layer 108, a recording gap layer 109 made of an insulating film such as an alumina film whose thickness is 0.2 μm is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 μm is formed for the recording head. At the same time, a magnetic layer 119 made of a magnetic material is formed for making the magnetic path in the contact hole 109a for making the magnetic path.

Next, as shown in FIG. 25A and FIG. 25B, the recording gap layer 109 and the bottom pole layer 108 are etched through ion milling, using the top pole tip 110 as a mask. As shown in FIG. 25B, the structure is called a trim structure wherein the sidewalls of the top pole (the top pole tip 110), the recording gap layer 109, and a part of the bottom pole layer 108 are formed vertically in a self-aligned manner.

Next, an insulating layer 111 made of an alumina film, for example, and having a thickness of about 3 μm is formed on the entire surface. The insulating layer 111 is then polished to the surfaces of the top pole tip 110 and the magnetic layer 119 and flattened.

Next, on the flattened insulating layer 111, a first layer 112 of a thin-film coil is made of copper (Cu), for example, for the induction-type recording head. Next, a photoresist layer 113 is formed into a specific shape on the insulating layer 111 and the first layer 112. Heat treatment is then performed at a specific temperature to flatten the surface of the photoresist layer 113. On the photoresist layer 113, a second layer 114 of the thin-film coil is then formed. Next, a photoresist layer 115 is formed into a specific shape on the photoresist layer 113 and the second layer 114. Heat treatment is then performed at a specific temperature to flatten the surface of the photoresist layer 115.

Next, as shown in FIG. 26A and FIG. 26B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, lapping of the slider is performed to form the air bearing surface 118 of the thin-film magnetic head including the recording head and the reproducing head. The thin-film magnetic head is thus completed.

FIG. 27 is a top view of the thin-film magnetic head shown in FIG. 26A and FIG. 26B. The overcoat layer 117 and the other insulating layers and insulating films are omitted in FIG. 27.

In FIG. 26A, 'TH' indicates the throat height and 'MR-H' indicates the MR height. The throat height is the length (height) of pole portions, that is, portions of magnetic pole layers facing each other with a recording gap layer in between, the length between the air-bearing-surface-side end and the other end. The MR height is the length (height) between the air-bearing-surface-side end of the MR element and the other end. In FIG. 26B, 'P2W' indicates the pole width, that is, the track width of the recording head (hereinafter called the recording track width). In addition to the factors such as the throat height and the MR height, the apex angle as indicated with θ in FIG. 26A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 26A and FIG. 26B.

To achieve high surface recording density, that is, to fabricate a recording head with a narrow track structure, it has been particularly required that track width P2W fall within the submicron order of 1.0 μm or less. It is therefore required to process the top pole of the submicron order through semiconductor process techniques.

A problem is that it is difficult to form the top pole layer of small dimensions on the apex.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern having a width of the submicron order through the use of a photoresist film. Therefore, it is required to form a fine pattern of the submicron order on top of the apex through the use of a photoresist film having a thickness of 8 to 10 μm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may go out of shape. It is therefore impossible to obtain a sharp and precise photoresist pattern.

In the region on the slope of the apex, in particular, the rays reflected off the bottom electrode film include not only vertical reflected rays but also rays in slanting directions and rays in lateral directions from the slope of the apex. As a result, the photoresist is exposed to those reflected rays of light and the photoresist pattern more greatly goes out of shape.

With regard to the track width, it is required that the amount of lapping the slider will not affect the track width.

Therefore, when the top pole layer is formed on the apex, some means is required for reducing the effect on the track width of the rays reflected off the bottom electrode film during exposure of the photolithography process.

For example, the top pole layer of a prior-art thin film magnetic head has the shape including a portion having a width equal to the track width. This portion is located between the air bearing surface and a point at a distance of only 3 to 5 μm, for example, from the zero throat height position (the position of an end of the pole portion opposite to the air bearing surface) toward the apex. A portion of the top pole layer next to the portion having a width equal to the track width has a width extending toward the coil at an obtuse angle of 30 or 45 degrees.

However, if the top pole layer has the shape as described above, a magnetic flux is saturated near the zero throat height position and it is impossible to efficiently utilize the magnetomotive force generated by the coil for writing. As a result, the value indicating an overwrite property is reduced down to about 10 to 20 dB, for example. The overwrite property is a parameter indicating one of characteristics when data is written over existing data on a recording medium. It is therefore difficult to obtain a sufficient overwrite property.

In addition, if the top pole layer has the shape as described above, a portion of the top pole layer whose width starts to extend is located on the slope of the apex. However, if the top pole layer has such a shape and is located in such a manner, the photoresist pattern is particularly susceptible to the rays reflected off the bottom electrode film. It is therefore difficult to precisely control the track width.

As thus described, the problem of the prior art is that it is difficult to precisely control the track width if the track width of the submicron order is required and that a magnetic flux is likely to saturate near the zero throat height position.

In order to implement a thin-film magnetic head that achieves surface recording density of 10 to 40 gigabits per square inches, for example, or a thin-film magnetic head that performs recording in a good condition at a frequency as high as 300 to 600 MHz, for example, it is particularly important to form a reduced track width with uniformity and to utilize the magnetomotive force generated by the coil with efficiency for writing. It is therefore strongly required to solve the above-mentioned problems.

To overcome the problems thus described, a method has been taken, as shown in the foregoing related-art manufacturing steps illustrated in FIG. 24A to FIG. 26A and FIG. 24B to FIG. 26B. In this method, a track width of 1.0 μm or less is formed through the use of the top pole tip 110 effective for making a narrow track of the recording head. The top pole layer 116 to be a yoke portion connected to the top pole tip 110 is then fabricated (as disclosed in Published Unexamined Japanese Patent Application Sho 62-245509 [1987] and Published Unexamined Japanese Patent Application Sho 60-10409 [1985]). That is, the ordinary top pole layer is divided into the top pole tip 110 and the top pole layer 116 to be the yoke portion in this method. As a result, it is possible that the top pole tip 110 that defines the track width is formed into small dimensions to some degree on the flat top surface of the recording gap layer 109.

However, the following problems are still found in the thin-film magnetic head having a structure as shown in FIG. 26A and FIG. 26B.

In the thin-film magnetic head shown in FIG. 26A and FIG. 26B, the recording track width is defined by the top pole tip 110. Therefore, it is not necessary that the top pole layer 116 is processed into dimensions as small as those of the top pole tip 110. However, if the recording track width is extremely reduced, that is, down to 0.5 μm or less, in particular, processing accuracy for achieving the submicron-order width is required for the top pole layer 116, too. However, the top pole layer 116 is formed on top of the apex in the head shown in FIG. 26A and FIG. 26B. Therefore, it is difficult to reduce the top pole layer 116 in size, due to the reason described above. In addition, the top pole layer 116 is required to be greater than the top pole tip 110 in width since the top pole layer 116 is required to be magnetically connected to the top pole tip 110 smaller in width. Because of these reasons, the top pole layer 116 is greater than the top pole tip 110 in width in this thin-film magnetic head. In addition, the end face of the top pole layer 116 is exposed from the air bearing surface. As a result, writing may be performed by the thin-film magnetic head on a side of the top pole layer 116, too, and so-called 'side write' may result, that is, data is written in a region of a recording medium where data is not supposed to be written. Such a problem more frequently results when the coil is two-layer or three-layer to improve the performance of the recording head and the apex is thereby increased in height, compared to the case where the coil is one-layer.

In the thin-film magnetic head shown in FIG. 26A and FIG. 26B, the recording track width and the throat height are defined by the top pole tip 110. Therefore, if the recording track width is extremely reduced, that is, down to 0.5 $\mu$m or less, in particular, the size of the top pole tip 110 is thus extremely reduced. As a result, pattern edges may be rounded and it is difficult to form the top pole tip 110 with accuracy. Therefore, the thin-film magnetic head having the structure as shown in FIG. 26A and FIG. 26B has a problem that it is difficult to precisely define the recording track width and the throat height if the recording track width is extremely reduced.

In the thin-film magnetic head shown in FIG. 26A and FIG. 26B, the cross-sectional area of the magnetic path abruptly decreases in a portion where the top pole layer 116 is in contact with the top pole tip 110. Consequently, the magnetic flux is saturated in this portion, and it is impossible to efficiently utilize the magnetomotive force generated by the layers 112 and 114 of the thin-film coil for recording.

Furthermore, it is difficult to reduce the magnetic path (yoke) length of a prior-art magnetic head. That is, if the coil pitch is reduced, a head with a reduced yoke length is achieved and a recording head having an excellent high frequency characteristic is achieved, in particular. However, if the coil pitch is reduced to the limit, the distance between the zero throat height position (the position of the air-bearing-surface-side end of the insulating layer that defines the throat height) and the outermost end of the coil is a major factor that prevents a reduction in yoke length. Since the yoke length of a two-layer coil can be shorter than that of a single-layer coil, a two-layer coil is adopted to many of recording heads for high frequency application. However, in the prior-art magnetic head, a photoresist film having a thickness of about 2 $\mu$m is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion since it is impossible to etch the seed layer of the coil in the sloped portion of the apex, and the coil is thereby shorted.

Therefore, if the total coil thickness is 2 to 3 $\mu$m, the thickness of the insulating film between the layers of the coil is 2 $\mu$m, and the apex angle is 45 to 55 degrees, for example, the yoke length is required to be 6 to 8 $\mu$m which is twice as long as the distance between the outermost end of the coil and the neighborhood of the zero throat height position, that is, 3 to 4 $\mu$m (the distance between the innermost end of the coil and the portion where the top and bottom pole layers are in contact with each other is required to be 3 to 4 $\mu$m, too), in addition to the length of the portion corresponding to the coil. This length of the portion other than the portion corresponding to the coil is one of the factors that prevent a reduction in yoke length.

Assuming that a two-layer eleven-turn coil in which the line width is 1.2 $\mu$m and the space is 0.8 $\mu$m is fabricated, for example, the portion of the yoke length corresponding to the first layer 112 of the coil is 11.2 $\mu$m, if the first layer is made up of six turns and the second layer is made up of 5 turns, as shown in FIG. 26A and FIG. 26B. In addition to this length, the total of 6 to 8 $\mu$m, that is, the distance between each of the outermost and innermost ends of the first layer 112 of the coil and each of ends of the photoresist layer 113 for insulating the first layer 112, is required for the yoke length. Therefore, the yoke length is 17.5 to 19.5 $\mu$m. In the present patent application, the yoke length is the length of a portion of the pole layer except the pole portion and the contact portions, as indicated with Lo in FIG. 26A. As thus described, it is difficult in the prior art to further reduce the yoke length, which prevents improvements in high frequency characteristic.

OBJECTS AND SUMMARY OF THE INVENTION

It is a first object of the invention to provide a thin-film magnetic head and a method of manufacturing the same for precisely controlling a track width of a recording head even when the track width is reduced, and for preventing a magnetic flux from saturating halfway through a magnetic path, and for achieving a reduction in a yoke length.

It is a second object of the invention to provide a thin-film magnetic head and a method of manufacturing the same for precisely controlling a track width of a recording head even when the track width is reduced, and for preventing a magnetic flux from saturating halfway through a magnetic path, and for preventing writing of data in a region where data is not supposed to be written and preventing erasing of data in the region where data is not supposed to be written.

A first thin-film magnetic head of the invention comprises: a medium facing surface that faces toward a recording medium; a reproducing head including: a magnetoresistive element; and a first shield layer and a second shield layer for shielding the magnetoresistive element, portions of the shield layers located on a side of the medium facing surface being opposed to each other with the magnetoresistive element in between; and a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The first magnetic layer includes: a first portion located in a region facing toward the at least part of the thin-film coil; and a second portion connected to a surface of the first portion facing toward the thin-film coil, the second portion including a portion that forms one of the pole portions and defines a throat height. The portion of the second portion of the first magnetic layer that defines the throat height has a length between an end thereof located in the medium facing surface and the other end, the length being greater than a length of the magnetoresistive element between an end thereof located in the medium facing surface and the other end. The at least part of the thin-film coil is located on a side of the second portion of the first magnetic layer. The second magnetic layer defines a track width.

First and second methods of the invention are provided for manufacturing a thin-film magnetic head comprising: a medium facing surface that faces toward a recording medium; a reproducing head including: a magnetoresistive element; and a first shield layer and a second shield layer for shielding the magnetoresistive element, portions of the shield layers located on a side of the medium facing surface being opposed to each other with the magnetoresistive element in between; and a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. In this head the second magnetic layer defines a track width.

The first method of the invention includes the steps of: forming the reproducing head; forming the first magnetic layer; forming the gap layer on the first magnetic layer; forming the second magnetic layer on the gap layer; and forming the thin-film coil such that the at least part of the coil is placed between the first and second magnetic layers, the at least part of the coil being insulated from the first and second magnetic layers. The step of forming the first magnetic layer includes formation of: a first portion located in a region facing toward the at least part of the thin-film coil; and a second portion connected to a surface of the first portion facing toward the thin-film coil, the second portion including a portion that forms one of the pole portions and defines a throat height. The portion of the second portion of the first magnetic layer that defines the throat height is made to have a length between an end thereof located in the medium facing surface and the other end, the length being greater than a length of the magnetoresistive element between an end thereof located in the medium facing surface and the other end. The at least part of the thin-film coil is located on a side of the second portion of the first magnetic layer in the step of forming the coil.

According to the first thin-film magnetic head or the first method of the invention, the throat height is defined by the second portion of the first magnetic layer. The track width is defined by the second magnetic layer. According to the invention, at least a part of the thin-film coil is located on a side of the second portion of the first magnetic layer. As a result, the second magnetic layer is formed on the flat surface with accuracy. It is thereby possible to precisely control the track width as well as to prevent saturation of a magnetic flux in the second magnetic layer. According to the invention, it is possible that an end of at least a part of the thin-film coil is located near an end of the second portion of the first magnetic layer. It is thereby possible to reduce the yoke length. According to the invention, the portion of the second portion of the first magnetic layer that defines the throat height has the length between an end thereof located in the medium facing surface and the other end, the length being greater than the length of the magnetoresistive element between an end thereof located in the medium facing surface and the other end. As a result, it is possible to prevent saturation of a magnetic flux in the first magnetic layer.

According to the first thin-film magnetic head or the first method of the invention, a width of the second magnetic layer measured in a position corresponding to the other end of the portion of the second portion of the first magnetic layer may be greater than a width of the second magnetic layer measured in the medium facing surface.

According to the first thin-film magnetic head or the first method of the invention, the second magnetic layer may include: a portion having a width equal to the track width and located closer to the medium facing surface than the other portion of the second magnetic layer; and the other portion having a width greater than the track width, the width of the other portion decreasing toward the medium facing surface.

According to the first thin-film magnetic head or the first method, the portion of the second portion of the first magnetic layer that defines the throat height has the length between the end thereof located in the medium facing surface and the other end, the length being preferably 150 to 600 percent of the length of the magnetoresistive element between the end thereof located in the medium facing surface and the other end. More preferably, this length is 300 to 500 percent.

According to the first thin-film magnetic head or the first method, an insulating layer may be further provided. The insulating layer covers the at least part of the thin-film coil located on the side of the second portion of the first magnetic layer. A surface of the insulating layer facing toward the second magnetic layer is flattened together with a surface of the second portion facing toward the second magnetic layer.

According to the first thin-film magnetic head or the first method, the second magnetic layer may be made up of one layer.

According to the first thin-film magnetic head or the first method, the second magnetic layer may include: a pole portion layer including one of the pole portions that defines the track width; and a yoke portion layer forming a yoke portion and connected to the pole portion layer.

According to the first thin-film magnetic head or the first method, an end face of the yoke portion layer facing toward the medium facing surface may be located at a distance from the medium facing surface. In this case, the pole portion layer may have a length between an end thereof located in the medium facing surface and the other end, the length being greater than the length of the magnetoresistive element between the end thereof located in the medium facing surface and the other end. In addition, the distance between the medium facing surface and the end face of the yoke portion layer facing toward the medium facing surface may be equal to or greater than the length of the magnetoresistive element. The thin-film coil may include: a first layer located on a side of the second portion of the first magnetic layer; and a second layer located on a side of the pole portion layer of the second magnetic layer. In this case, a first insulating layer and a second insulating layer may be further provided. The first insulating layer covers the first layer of the coil and has a surface facing toward the second magnetic layer, the surface being flattened together with a surface of the second portion of the first magnetic layer facing toward the second magnetic layer. The second insulating layer covers the second layer of the coil and has a surface facing toward the yoke portion layer, the surface being flattened together with a surface of the pole portion layer of the second magnetic layer facing toward the yoke portion layer.

According to the first thin-film magnetic head or the first method, the other end of the portion of the second portion of the first magnetic layer may have a shape of a straight line parallel to the medium facing surface.

According to the first thin-film magnetic head or the first method, the second portion of the first magnetic layer may surround the at least part of the thin-film coil.

According to the first thin-film magnetic head or the first method, the second portion of the first magnetic layer may include a portion located closer to the medium facing surface than the other part of the second portion, the portion having a width smaller than a width of the other part of the second portion.

According to the first thin-film magnetic head or the first method, the second portion of the first magnetic layer may include: a center portion facing the second magnetic layer and defining the throat height; and side portions formed at both ends of a width of the center portion. At least a part of the side portions has a length between an end thereof located in the medium facing surface and the other end, the length being greater than the throat height.

A second thin-film magnetic head of the invention comprises: a medium facing surface that faces toward a recording medium; a reproducing head including: a magnetoresistive element; and a first shield layer and a second shield layer for shielding the magnetoresistive element, portions of the shield layers located on a side of the medium facing surface being opposed to each other with the magnetoresistive element in between; and a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The second magnetic layer includes: a pole portion layer including one of the pole portions that defines the track width; and a yoke portion layer forming a yoke portion and connected to the pole portion layer. The pole portion layer has a length between an end thereof located in the medium facing surface and the other end, the length being greater than a length of the magnetoresistive element between an end thereof located in the medium facing surface and the other end. An end face of the yoke portion layer facing toward the medium facing surface is located at a distance from the medium facing surface, the distance between the medium facing surface and the end face of the yoke portion layer being equal to or greater than the length of the magnetoresistive element.

The second method of the invention includes the steps of: forming the reproducing head; forming the first magnetic layer; forming the gap layer on the first magnetic layer; forming the second magnetic layer on the gap layer; and forming the thin-film coil such that the at least part of the coil is placed between the first and second magnetic layers, the at least part of the coil being insulated from the first and second magnetic layers. In the step of forming the second magnetic layer, a pole portion layer and a yoke portion layer are formed, the pole portion layer including one of the pole portions that defines the track width, the yoke portion layer forming a yoke portion and being connected to the pole portion layer. The pole portion layer is made to have a length between an end thereof located in the medium facing surface and the other end, the length being greater than a length of the magnetoresistive element between an end thereof located in the medium facing surface and the other end. An end face of the yoke portion layer facing toward the medium facing surface is located at a distance from the medium facing surface, the distance between the medium facing surface and the end face of the yoke portion layer being equal to or greater than the length of the magnetoresistive element.

According to the second thin-film magnetic head or the second method of the invention, the second magnetic layer is divided into the pole portion layer and the yoke portion layer. It is thereby possible to precisely control the track width. According to the invention, the pole portion layer has the length between an end thereof located in the medium facing surface and the other end, the length being greater than the length of the magnetoresistive element between an end thereof located in the medium facing surface and the other end. An end face of the yoke portion layer facing toward the medium facing surface is located at a distance from the medium facing surface, the distance between the medium facing surface and the end face of the yoke portion layer being equal to or greater than the length of the magnetoresistive element. As a result, it is possible to prevent a magnetic flux from saturating halfway through the magnetic path and to prevent writing of data in a region where data is not supposed to be written and erasing of data where data is not supposed to be written.

According to the second thin-film magnetic head or the second method of the invention, the first magnetic layer may include: a first portion located in a region facing toward the at least part of the thin-film coil, and a second portion connected to a surface of the first portion facing toward the thin-film coil, the second portion including a portion that forms one of the pole portions and defines a throat height. In addition, the at least part of the thin-film coil may be located on a side of the second portion of the first magnetic layer.

According to the second thin-film magnetic head or the second method, the thin-film coil may include: a first layer located on a side of the second portion of the first magnetic layer; and a second layer located on a side of the pole portion layer of the second magnetic layer. In this case, a first insulating layer and a second insulating layer may be further provided. The first insulating layer covers the first layer of the coil and has a surface facing toward the second magnetic layer, the surface being flattened together with a surface of the second portion of the first magnetic layer facing toward the second magnetic layer. The second insulating layer covers the second layer of the coil and has a surface facing toward the yoke portion layer, the surface being flattened together with a surface of the pole portion layer of the second magnetic layer facing toward the yoke portion layer.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 14A and FIG. 14B are cross sections for illustrating a step in a method of manufacturing a thin-film magnetic head of a sixth embodiment of the invention.

FIG. 15A and FIG. 15B are cross sections for illustrating a step that follows FIG. 14A and FIG. 14B.

FIG. 16A and FIG. 16B are cross sections for illustrating a step that follows FIG. 15A and FIG. 15B.

FIG. 23A and FIG. 23B are cross sections for illustrating a step in a method of manufacturing a thin-film magnetic head of related art.

FIG. 24A and FIG. 24B are cross sections for illustrating a step that follows FIG. 23A and FIG. 23B.

DETAILED DESCRIPTION OF THE PREFERRED EMBODIMENTS

Figures 4A, 4B:
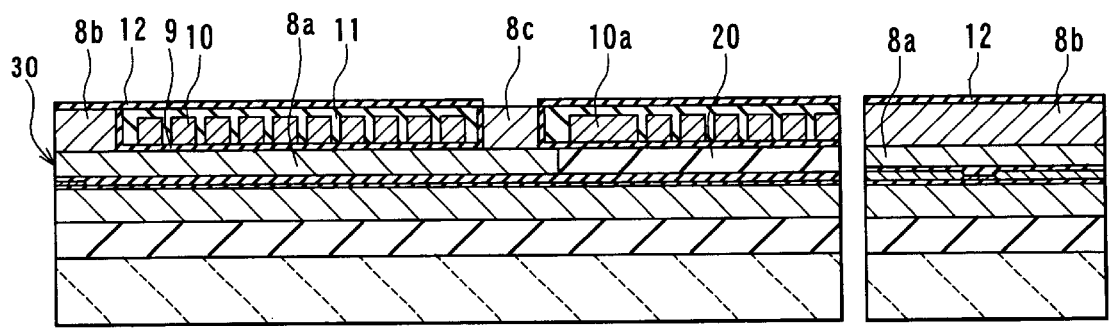
FIG. 4A and FIG. 4B are cross sections for illustrating a step that follows FIG. 3A and FIG. 3B.

Preferred embodiments of the invention will now be described in detail with reference to the accompanying drawings.

[First Embodiment]

Reference is now made to FIG. 1A to FIG. 6A, FIG. 1B to FIG. 6B, and FIG. 7 to FIG. 9 to describe a thin-film magnetic head and a method of manufacturing the same of a first embodiment of the invention. FIG. 1A to FIG. 6A are cross sections each orthogonal to an air bearing surface. FIG. 1B to FIG. 6B are cross sections of the pole portion each parallel to the air bearing surface.

In the manufacturing method, as shown in FIG. 1A and FIG. 1B, an insulating layer 2 made of alumina ($Al_2O_3$), for example, whose thickness is about 5 µm, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 µm is formed for making a reproducing head.

The bottom shield layer 3 is formed through plating selectively on the insulating layer 2 with a photoresist film as a mask, for example. Next, although not shown, an insulating layer of alumina, for example, having a thickness of 4 to 5 µm, for example, is formed over the entire surface. This insulating layer is polished through chemical mechanical polishing (CMP), for example, so that the bottom shield layer 3 is exposed, and the surface is flattened.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD) using trimethyl aluminum ($Al(CH_3)_3$) and $H_2O$, for example. Through the use of CVD, it is possible to make the thin and precise shield gap films 4 and 7 with few pinholes.

Next, on the top shield gap film 7, a first portion 8a of a top-shield layer-cum-bottom-pole-layer (called a bottom pole layer in the following description) 8 having a thickness of about 1.0 to 1.5 µm is selectively formed. The bottom pole layer 8 is made of a magnetic material and used for both a reproducing head and a recording head. The bottom pole layer 8 is made up of a second portion 8b and the third portion 8c described later, in addition to the first portion 8a. The first portion 8a is placed in a region facing toward at least a part of a thin-film coil described later.

Next, the second portion 8b and the third portion 8c of the bottom pole layer 8, each having a thickness of about 1.5 to 2.5 µm, are formed on the first portion 8a. The second portion 8b makes up a pole portion of the bottom pole layer 8 and is connected to a surface of the first portion 8a that faces toward the thin-film coil (on the upper side of the drawings). The third portion 8c is provided for connecting the first portion 8a to a top pole layer described later. The throat height is defined by the position of an end of a portion of the second portion 8b opposite to the air bearing surface 30. This portion of the second portion 8b faces toward the top pole layer. That is, this portion of the second portion 8b is the portion that defines the throat height. The zero throat height position is the position of the end of this portion of the second portion 8b.

The second portion 8b and the third portion 8c of the bottom pole layer 8 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, as shown in FIG. 3A and FIG. 3B, an insulating film 9 of alumina, for example, is formed over the entire surface. The thickness of the insulating film 9 is about 0.3 to 0.6 μm.

Next, a photoresist is patterned through a photolithography process to form a frame 19 for making the thin-film coil through frame plating. Next, the thin-film coil 10 made of copper (Cu), for example, is formed by frame plating through the use of the frame 19. For example, the thickness of the coil 10 is about 1.0 to 2.0 μm and the pitch is 1.2 to 2.0 μm. The frame 19 is then removed. In the drawings numeral 10a indicates a portion for connecting the thin-film coil 10 to a conductive layer (lead) described later.

Next, as shown in FIG. 4A and FIG. 4B, an insulating layer 11 of alumina, for example, having a thickness of about 3 to 4 μm is formed over the entire surface. The insulating layer 11 is then polished through CMP, for example, until the second portion 8b and the third portion 8c of the bottom pole layer 8 are exposed, and the surface is flattened. Although the thin-film coil 10 is not exposed in FIG. 4A and FIG. 4B, the coil 10 may be exposed.

Next, a recording gap layer 12 made of an insulating material whose thickness is 0.2 to 0.3 μm, for example, is formed on the second portion 8b and the third portion 8c of the bottom pole layer 8 exposed and the insulating layer 11. In general, the insulating material used for the recording gap layer 12 may be alumina, aluminum nitride, a silicon-dioxide-base material, a silicon-nitride-base material, or diamond-like carbon (DLC) and so on.

Next, a portion of the recording gap layer 12 located on top of the third portion 8c is etched to form a contact hole for making the magnetic path. Portions of the recording gap layer 12 and the insulating layer 11 located on top of the connecting portion 10a of the coil 10 are etched to form a contact hole.

Figures 5A, 5B:
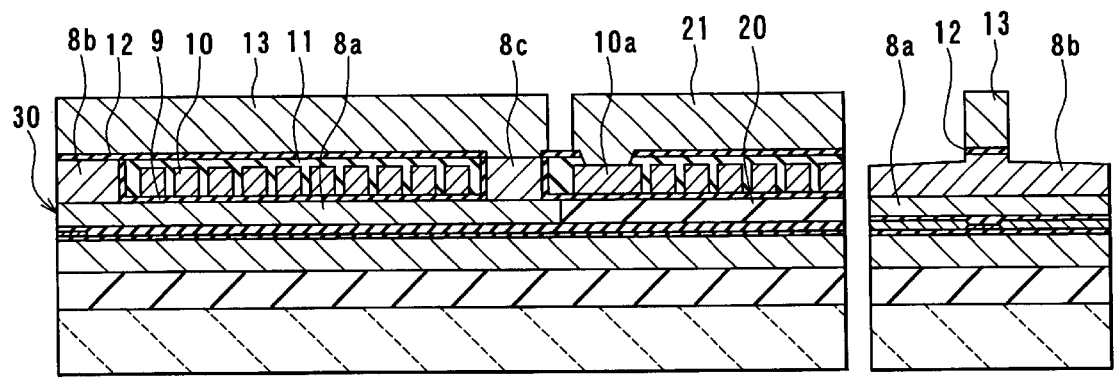
FIG. 5A and FIG. 5B are cross sections for illustrating a step that follows FIG. 4A and FIG. 4B.
Figures 6A, 6B:
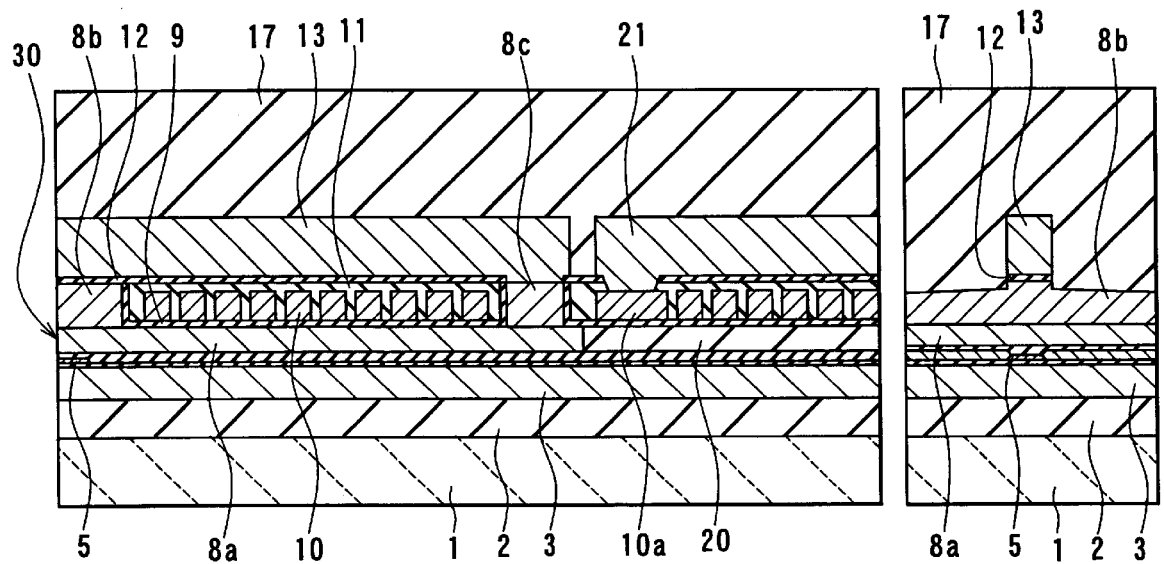
FIG. 6A and FIG. 6B are cross sections of the thin-film magnetic head of the first embodiment.

Next, as shown in FIG. 5A and FIG. 5B, on the recording gap layer 12, the top pole layer 13 having a thickness of about 2.0 to 3.0 μm is formed in a region extending from the air bearing surface 30 to the portion on top of the third portion 8c of the bottom pole layer 8. In addition, the conductive layer 21 having a thickness of about 2.0 to 3.0 μm is formed. The conductive layer 21 is connected to the portion 10a of the thin-film coil 10. The top pole layer 13 is connected to the third portion 8c of the bottom pole layer 8 through the contact hole formed in the portion on top of the third portion 8c.

The top pole layer 13 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used. In order to improve the high frequency characteristic, the top pole layer 13 may be made up of layers of inorganic insulating films and magnetic layers of Permalloy, for example.

Next, the recording gap layer 12 is selectively etched through dry etching, using the top pole layer 13 as a mask. The dry etching may be reactive ion etching (RIE) using a chlorine-base gas such as $BCl_2$ or $Cl_2$ or a fluorine-base gas such as $CF_4$ or $SF_6$, for example. Next, the second portion 8b of the bottom pole layer 8 is selectively etched by about 0.3 to 0.6 μm through argon ion milling, for example. A trim structure as shown in FIG. 5B is thus formed. The trim structure suppresses an increase in the effective track width due to expansion of a magnetic flux generated during writing in a narrow track.

Next, an overcoat layer 17 of alumina, for example, having a thickness of 20 to 40 μm is formed over the entire surface. The surface of the overcoat layer 17 is then flattened and pads (not shown) for electrodes are formed on the overcoat layer 17. Finally, lapping of the slider is performed to form the air bearing surface 30 of the thin-film magnetic head including the recording head and the reproducing head. The thin-film magnetic head, of the embodiment is thus completed.

In this embodiment the bottom pole layer 8 made up of the first portion 8a, the second portion 8b and the third portion 8c corresponds to a first magnetic layer of the invention. The top pole layer 13 corresponds to a second magnetic layer of the invention. The portion of the second portion 8b that faces toward the top pole layer 13 corresponds to a portion of a second portion of the first magnetic layer that defines the throat height of the invention. Since the bottom pole layer 8 also functions as the top shield layer, the bottom pole layer 8 corresponds to a second shield layer of the invention, too.

Figure 7:
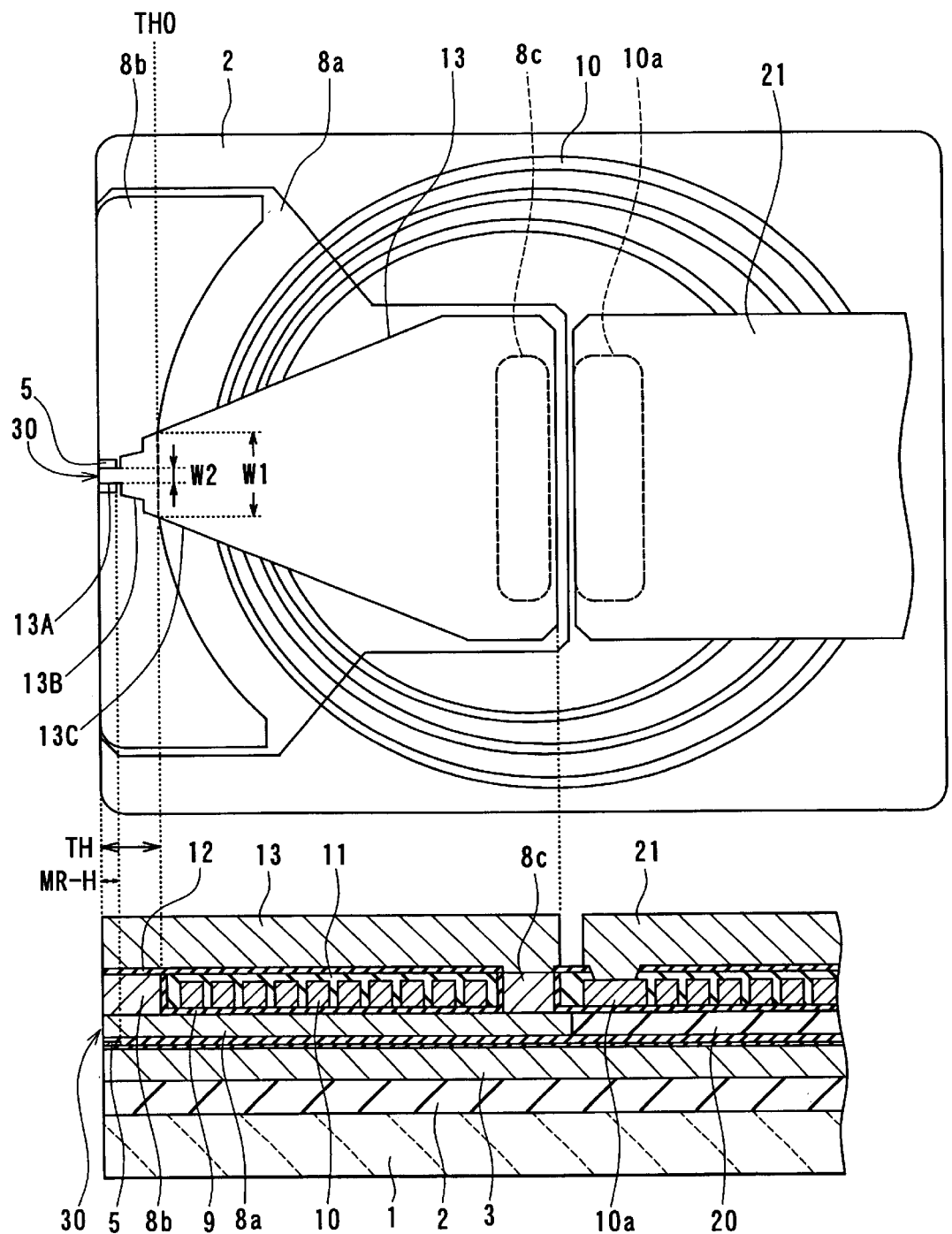
FIG. 7 is an explanatory view for illustrating the relationship between a top view of the main part of the thin-film magnetic head of the first embodiment and a cross-sectional view thereof.

FIG. 7 is an explanatory view for illustrating the relationship between a top view (an upper view of FIG. 7) of the main part of the thin-film magnetic head of the embodiment and a cross-sectional view (a lower view of FIG. 7) thereof. The overcoat layer 17 and the other insulating layers and films are omitted in FIG. 7. In FIG. 7 'TH' indicates the throat height, 'THO' indicates the zero throat height position, and 'MR-H' indicates the MR height.

Figure 8:
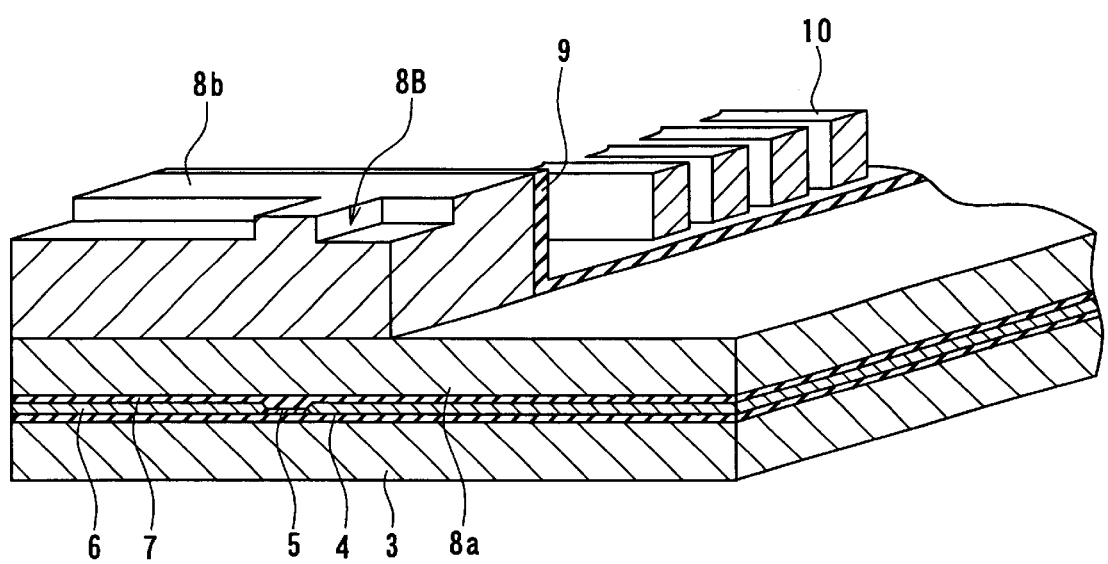
FIG. 8 is a perspective view of the main part of the thin-film magnetic head of the first embodiment, a part of which is cut away.

FIG. 8 is a perspective view of portions of the thin-film magnetic head of the embodiment including the layers from the bottom shield layer 3 to the second portion 8b of the bottom pole layer 8, the insulating film 9 and the coil 10, a part of which is cut away. In FIG. 8 numeral 8B indicates a portion of the second portion 8b etched to make the trim structure.

Figure 9:
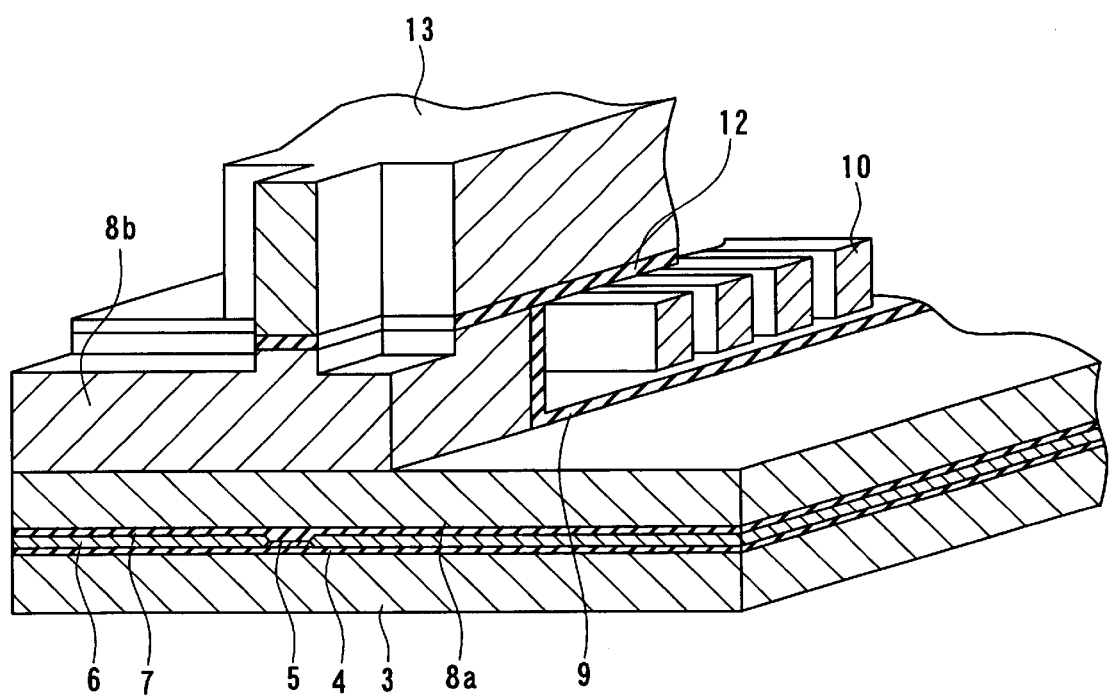
FIG. 9 is a perspective view of the main part of the thin-film magnetic head of the first embodiment, a part of which is cut away.

FIG. 9 is a perspective view of the portions of the head shown in FIG. 8 to which the recording gap layer 12 and the top pole layer 13 are added, a part of which is cut away.

As described so far, the thin-film magnetic head of the embodiment comprises the medium facing surface (air bearing surface 30) facing toward a recording medium, the reproducing head and the recording head (induction-type magnetic transducer). The reproducing head has: the MR element 5; and the bottom shield layer 3 and the top shield layer (bottom pole layer 8) for shielding the MR element 5. Portions of the bottom shield layer 3 and the top shield layer facing toward a recording medium are opposed to each other, the MR element 5 being placed between the portions.

The recording head has the bottom pole layer 8 (including the first portion 8a, the second portion 8b and the third portion 8c) and the top pole layer 13 magnetically coupled to each other, each of which includes at least one layer. The bottom pole layer 8 and the top pole layer 13 include pole portions opposed to each other and placed in regions on a side of the medium facing surface. The recording head further has: the recording gap layer 12 placed between the pole portion of the bottom pole layer 8 and the pole portion of the top pole layer 13; and the thin-film coil 10 at least a part of which is placed between the bottom pole layer 8 and the top pole layer 13, the at least part of the coil 10 being insulated from the bottom pole layer 8 and the top pole layer 13.

In this embodiment the bottom pole layer 8 includes: the first portion 8a located in a region facing toward at least a part of the thin-film coil 10; and the second portion 8b connected to a surface of the first portion 8a that faces toward the coil 10 (the upper side of the accompanying cross-sectional views). The second portion 8b forms the pole portion and a portion of the second portion 8b defines the throat height. The coil 10 is located on a side of the second portion 8b (on the right side of the accompanying cross-sectional views).

In this embodiment throat height TH is the length of the portion of the second portion 8b of the bottom pole layer 8 that defines the throat height, the length between an end of the portion located in the air bearing surface 30 and the other end. (This length may be simply called the length of the second portion 8b in the following description.) Throat height TH is greater than MR height, that is, the length of the MR element 5 between an end thereof located in the air bearing surface 30 and the other end. The length of the second portion 8b is preferably 150 to 600 percent of MR height MR-H, and more preferably 300 to 500 percent. In other words, if MR height MRH is 0.5 μm, for example, the length of the second portion 8b is preferably 0.75 to 3.0 μm, and more preferably 1.5 to 2.5 μm.

In the embodiment the portion of the second portion 8b that faces toward the top pole layer 13 has an end opposite to the air bearing surface 30, this end having the shape of a straight line parallel to the air bearing surface 30. The other part of the second portion 8b has an end in the shape of an arc that approximates to the shape of the perimeter of the thin-film coil 10. Since the portion of the second portion 8b that faces toward the top pole layer 13 has the end having the above-described shape in this embodiment, it is possible to precisely control the throat height and the zero throat height position.

In the embodiment the track width is defined by the top pole layer 13. As shown in FIG. 7, the top pole layer 13 has a first portion 13A, a second portion 13B and a third portion 13C in the order in which the closest to the air bearing surface 30 comes first. The first portion 13A has a width equal to the recording track width. The second portion 13B is greater than the first portion 13A in width. The third portion 13C is greater than the second portion 13B in width.

The width of the third portion 13C gradually decreases toward the air bearing surface 30. It is preferred that each of lateral edges of a portion of the third portion 13C having a varying width forms an angle of 30 to 60 degrees with respect to the direction orthogonal to the air bearing surface 30, each of the lateral edges being located at each end of the width of the third portion 13C. The width of the second portion 13B gradually decreases toward the air bearing surface 30, too.

In the top pole layer 13 there are edges linking lateral edges of the first portion 13A orthogonal to the air bearing surface 30 to lateral edges of the second portion 13B located at ends of the width of the second portion 13B. These edges linking the lateral edges of the first portion 13A to the lateral edges of the second portion 13B are parallel to the air bearing surface 30. Similarly, the top pole layer 13 has edges linking the lateral edges of the second portion 13B to the lateral edges of the third portion 13C. These edges linking the lateral edges of the second portion 13B to the lateral edges of the third portion 13C are parallel to the air bearing surface 30.

In the top pole layer 13 the interface between the first portion 13A and the second portion 13B is located near the zero MR height position (the position of an end of the MR element 5 opposite to the air bearing surface 30).

In the top pole layer 13 the interface between the second portion 13B and the third portion 13C (the position near the stepped portions between the portion 13B and the portion 13C shown in FIG. 7) is located closer to the air bearing surface 30 (that is, on the left side of FIG. 7) than zero throat height position TH0, that is, the position of an end of the portion of the second portion 8b that faces toward the top pole layer 13, the end being opposite to the air bearing surface 30 (on the right side of FIG. 7). As a result, in this embodiment, width W1 of the top pole layer 13 at zero throat height position TH0 is greater than recording track width W2, that is, the width of the first portion 13A.

According to the embodiment thus described, the throat height is defined by the second portion 8b of the bottom pole layer 8. The thin-film coil 10 is located on the first portion 8a of the bottom pole layer 8 and on a side of the second portion 8b. The top surface of the insulating layer 11 covering the coil 10 is flattened, together with the top surface of the second portion 8b. As a result, the top pole layer 13 that defines the recording track width is formed on the flat surface. Therefore, according to the embodiment, it is possible to form the top pole layer 13 with accuracy and to precisely control the recording track width even if the recording track width is reduced down to the half-micron or quarter-micron order.

According to the embodiment, the width of the top pole layer 13 in the zero throat height position is greater than the recording track width. It is thereby possible to prevent a magnetic flux from saturating near the zero throat height position. In addition, the width of the top pole layer 13 gradually decreases toward the air bearing surface 30. Therefore, it is impossible that the cross-sectional area of the magnetic path abruptly decreases. Saturation of a magnetic flux halfway through the magnetic path is thereby prevented. According to the embodiment, it is thereby possible to utilize the magnetomotive force generated by the thin-film coil 10 for writing with efficiency and to improve the overwrite property.

According to the embodiment, the top pole layer 13 that defines the recording track width is formed on the flat surface. As a result, it is possible to prevent an increase in the width of the first portion 13A that defines the recording track width when the width of the top pole layer 13 in the zero throat height position is made greater than the recording track width as described above. If the top pole layer is formed on the apex, the width of the portion of the top pole layer that defines the recording track width is likely to increase, too, when the width of the top pole layer in the zero throat height position is made greater than the recording track width.

In the embodiment an end of the second portion 13B of the top pole layer 13 on a side of the air bearing surface 30 is parallel to the air bearing surface 30. The first portion 13A of the top pole layer 13 is connected to this end of the second portion 13B. Therefore, a photomask used for making the top pole layer 13 through photolithography has a shape including a side corresponding to the end of the second portion 13B on the side of the air bearing surface 30 and an additional concave or convex portion corresponding to the first portion 13A. Whether the portion corresponding to the first portion 13A is concave or convex depends on whether a negative photomask or a positive photomask is used. The top pole layer 13 is formed on the flat surface through the use of the photomask in the above-described shape. It is thereby possible to precisely control the width of the first portion 13A, that is, the recording track width.

According to the embodiment, the throat height is defined by the second portion 8b of the bottom pole layer 8. The length of the second portion 8b is greater than MR height MR-H, that is, the length of the MR element 5 between the end thereof located in the air bearing surface 30 and the other end. As a result, the areas of the first portion 8a and the second portion 8b touching each other are made greater. It is thereby possible to prevent a magnetic flux from saturating in those areas.

The greater the length of the second portion 8b than MR height MR-H, the greater are the areas of the first portion 8a and the second portion 8b touching each other. Therefore, if the difference between the length of the second portion 8b and MR height MR-H is small, the effect of preventing saturation of the flux is reduced, and the degree of an improvement in overwrite property is reduced. On the other hand, if the length of the second portion 8b is too great, the yoke length is made greater and the overwrite property is reduced, conversely. Therefore, there is a range of the preferred length of the second portion 8b. To be specific, the length of the second portion 8b is preferably 150 to 600 percent of MR height MR-H, and more preferably 300 to 500 percent, as mentioned above.

According to the embodiment as thus described, it is possible to precisely control the recording track width and to prevent a magnetic flux from saturating halfway through the magnetic path even if the recording track width is reduced.

In the embodiment the thin-film coil 10 is located on a side of the second portion 8b of the bottom pole layer 8 and formed on the flat insulating film 9. It is thereby possible to form the thin-film coil 10 of small dimensions with accuracy. Furthermore, according to the embodiment, it is possible that an end of the coil 10 is placed near the zero throat height position, that is, near the end of the second portion layer 8b opposite to the air bearing surface 30, since no apex exists.

As thus described, according to the embodiment, the yoke length is reduced by about 30 to 40 percent of that of a prior-art head, for example. As a result, it is possible to utilize a magnetomotive force generated by the thin-film coil 10 for writing with efficiency. It is therefore possible to provide a thin-film magnetic head having a recording head with an excellent high frequency characteristic, an excellent nonlinear transition shift (NLTS) characteristic and an excellent overwrite property.

According to the embodiment, a reduction in yoke length is achieved. As a result, it is possible to greatly reduce the entire length of the thin-film coil 10 without changing the number of turns of the coil. The resistance of the coil 10 is thereby reduced. It is therefore possible to reduce the thickness of the coil 10.

According to the embodiment, the insulating film 9 is provided between the first portion 8a of the bottom pole layer 8 and the thin-film coil 10. The insulating film 9 is thin and made of an inorganic material that achieves sufficient insulation strength. High insulation strength is thereby obtained between the first portion 8a and the coil 10.

In the embodiment the thin-film coil 10 is covered with the insulating layer 11 made of an inorganic insulation material. It is thereby possible to prevent the pole portion from protruding toward a recording medium due to expansion resulting from heat generated around the coil 10 when the thin-film magnetic head is used.

[Second Embodiment]

Figure 10:
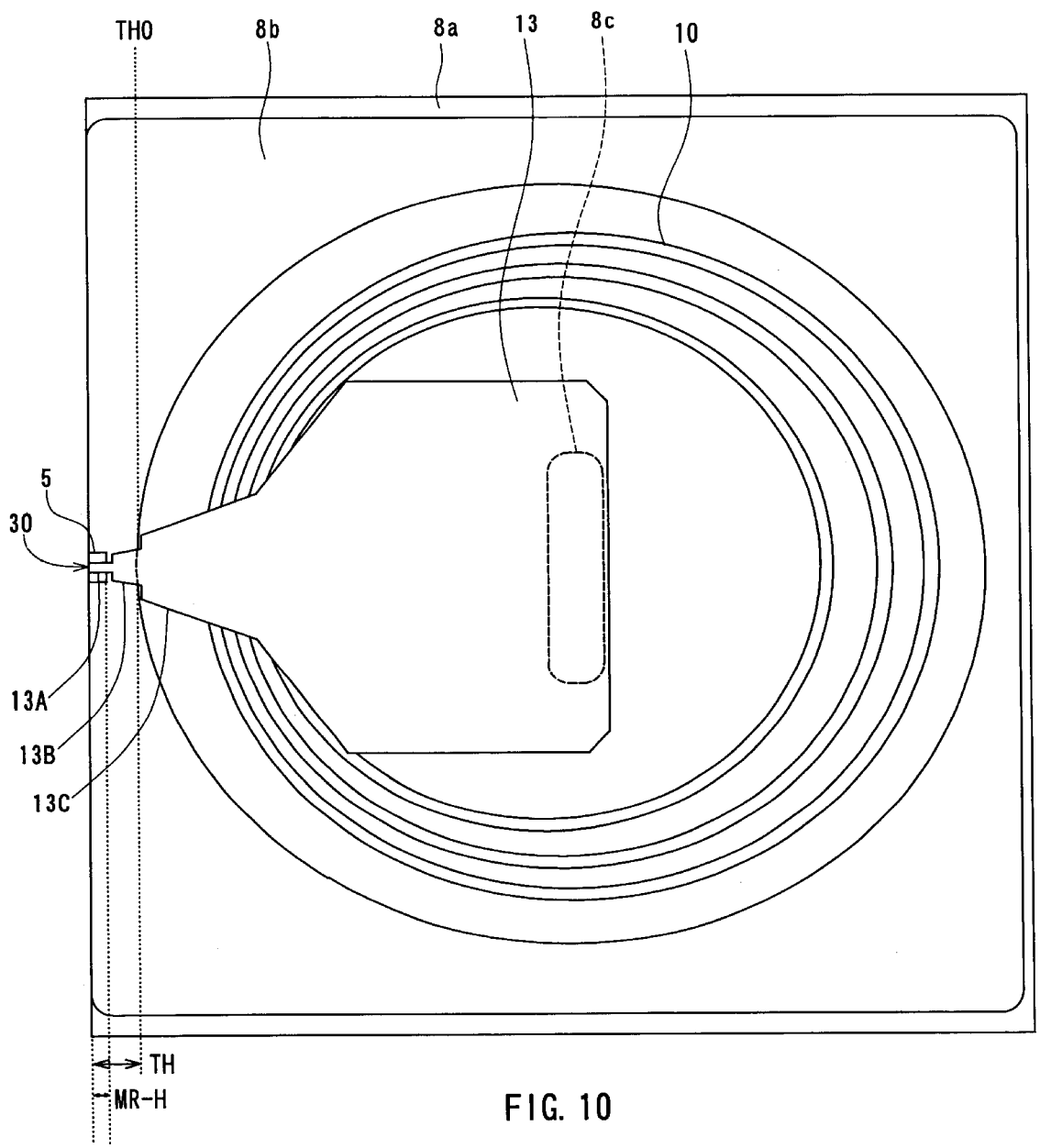
FIG. 10 is a top view of a thin-film magnetic head of a second embodiment of the invention.

Reference is now made to FIG. 10 to describe a thin-film magnetic head and a method of manufacturing the same of a second embodiment of the invention. FIG. 10 is a top view of the main part of the thin-film magnetic head of the embodiment, wherein an overcoat layer and the other insulating layers and films are omitted.

In the second embodiment the first portion 8a of the bottom pole layer 8 is formed in a region greater than the region of the first embodiment. To be specific, the first portion 8a is formed in the region greater the region where the entire thin-film coil 10 is placed. In addition, the second portion 8b of the bottom pole layer 8 is formed to surround the coil 10 in the second embodiment. In this embodiment throat height TH is the length of a portion of the second portion 8b that defines the throat height, the length between an end of this portion located in the air bearing surface 30 and the other end. As in the first embodiment, throat height TH is greater than MR height MR-H, that is, the length of the MR element 5 between an end thereof located in the air bearing surface 30 and the other end.

According to the second embodiment, it is possible to flatten the insulating layer 11 with further accuracy since the second portion 8b has the geometry described above.

The top pole layer 13 of the second embodiment has the first portion 13A, the second portion 13B and the third portion 13C in the order in which the closest to the air bearing surface 30 comes first. The first portion 13A and the second portion 13B have geometries similar to those of the first embodiment. The width of the third portion 13C varies in the following manner. The width thereof gradually increases from an end of the third portion 13C closer to the air bearing surface 30, forming an angle of 30 to 60 degrees, for example, with respect to the direction orthogonal to the air bearing surface 30. The width then increases, forming a greater angle, and finally becomes constant.

The remainder of the configuration, functions and effects of the embodiment are similar to those of the first embodiment.

[Third Embodiment]

Figure 11:
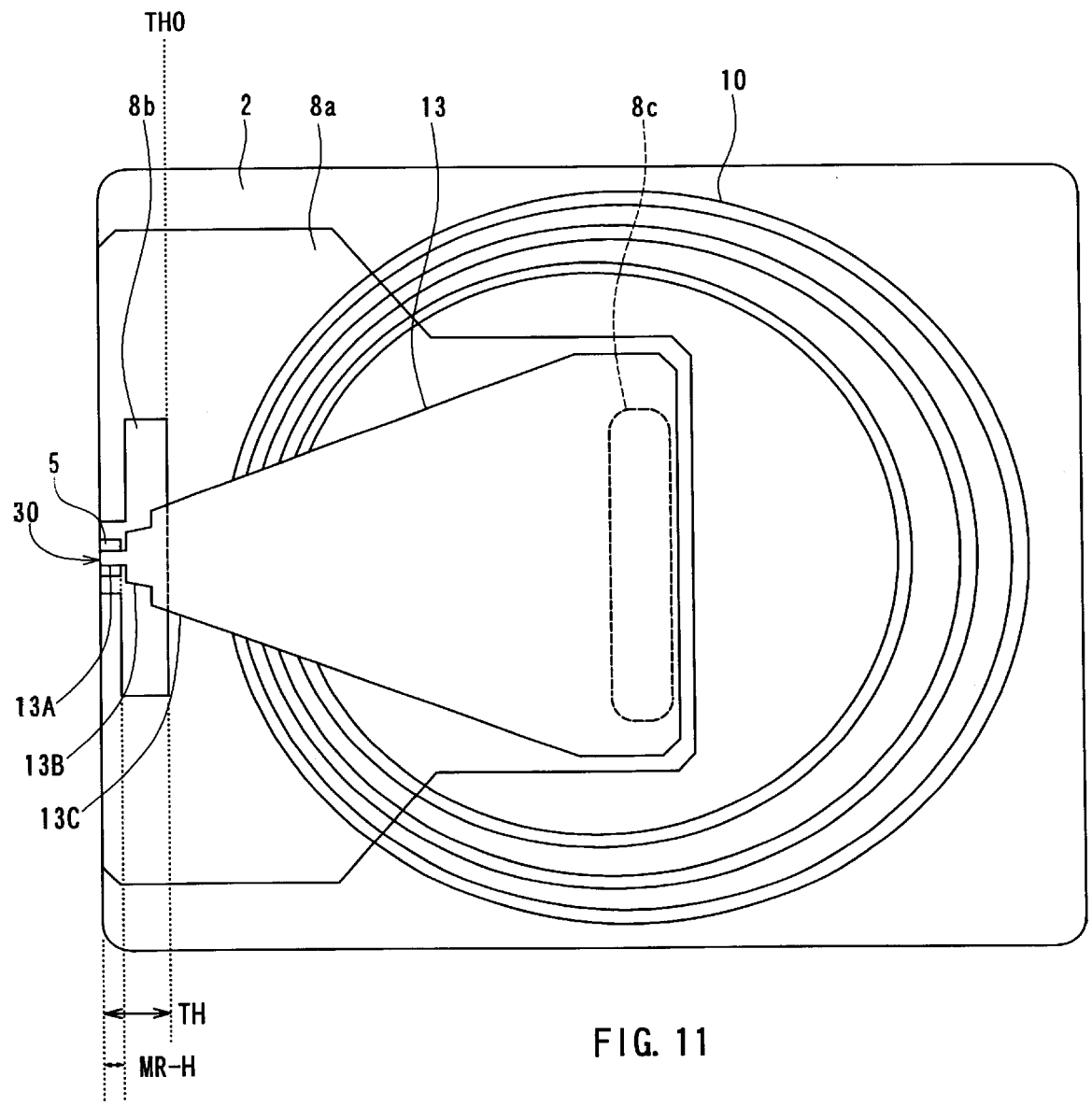
FIG. 11 is a top view of a thin-film magnetic head of a third embodiment of the invention.

Reference is now made to FIG. 11 to describe a thin-film magnetic head and a method of manufacturing the same of a third embodiment of the invention. FIG. 11 is a top view of the main part of the thin-film magnetic head of the embodiment, wherein an overcoat layer and the other insulating layers and films are omitted.

In the third embodiment the second portion 8b of the bottom pole layer 8 has a T-shape in which a portion closer to the air bearing surface 30 is smaller than the other portion in width. An end of the second portion 8b opposite to the air bearing surface 30 has the shape of a straight line parallel to the air bearing surface 30, and is located at zero throat height position TH0.

According to the embodiment, since the second portion 8b has the geometry as described above, it is possible to reduce the width of the second portion 8b in the air bearing surface 30 and to prevent an increase in effective track width. In addition, the width of the second portion 8b decreases toward the air bearing surface 30 in a step-by-step manner. It is thereby possible to prevent a magnetic flux from saturating in the bottom pole layer. 8. Furthermore, it is possible to precisely control the throat height and the zero throat height position since the end of the second portion 8b opposite to the air bearing surface 30 has the shape of a straight line parallel to the air bearing surface 30.

The remainder of the configuration, functions and effects of the embodiment are similar to those of the first embodiment.

[Fourth Embodiment]

Figure 12:
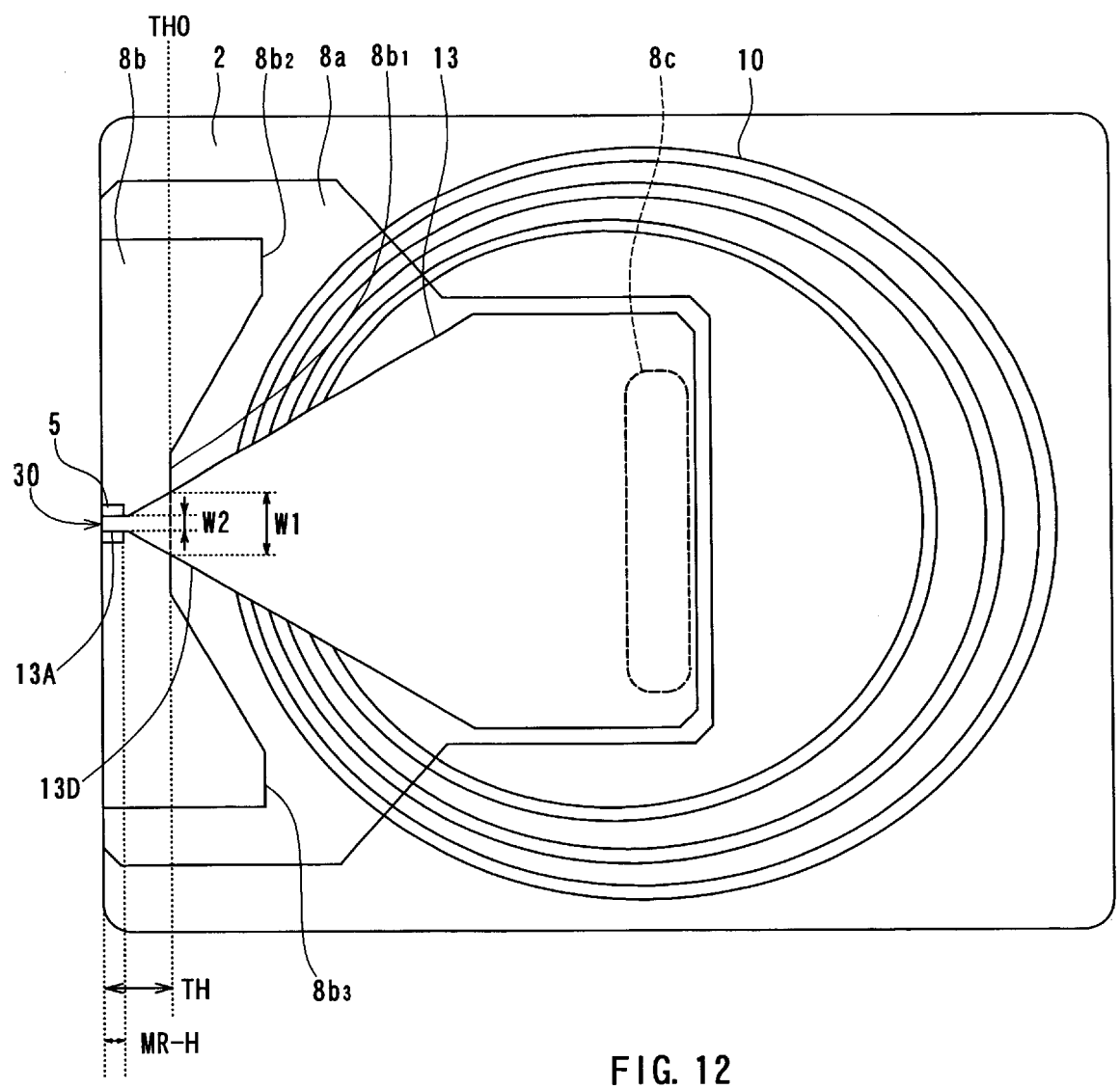
FIG. 12 is a top view of a thin-film magnetic head of a fourth embodiment of the invention.

Reference is now made to FIG. 12 to describe a thin-film magnetic head and a method of manufacturing the same of a fourth embodiment of the invention. FIG. 12 is a top view of the main part of the thin-film magnetic head of the embodiment, wherein an overcoat layer and the other insulating layers and films are omitted.

In the fourth embodiment the second portion 8b of the bottom pole layer 8 has: a center portion $8b_1$ that faces toward the top pole layer 13 and defines the throat height; and side portions $8b_2$ and $8b_3$ placed at ends of the width of the center portion $8b_1$. An end of the center portion $8b_1$ opposite to the air bearing surface 30 has the shape of a straight line parallel to the air bearing surface 30, and is located at zero throat height position TH0. The length of each of the side portions $8b_2$ and $8b_3$ between an end located in the air bearing surface 30 and the other end is equal to the throat height at the interface between the center portion $8b_1$ and each of the side portions $8b_2$ and $8b_3$. The length increases as the distance from the interface becomes greater, and finally becomes constant.

The top pole layer 13 of this embodiment has the first portion 13A and a second portion 13D in the order in which the closest to the air bearing surface 30 comes first. The width of the first portion 13A is equal to the recording track width. The width of the second portion 13D is equal to the recording track width at the interface with the first portion 13A, and gradually increases as the distance from the air bearing surface 30 increases. It is preferred that each of the lateral edges of the portion of the second portion 13D having the increasing width forms an angle of 30 to 60 degrees with respect to the direction orthogonal to the air bearing surface 30. The interface between the first portion 13A and the second portion 13D is located closer to the air bearing surface 30 than zero throat height position TH0. Therefore, width W1 of the top pole layer 13 at zero throat height position TH0 is greater than recording track width W2, that is, the width of the first portion 13A. It is preferred that the interface between the first portion 13A and the second portion 13D is located at a distance of 0 to 1.0 µm from the zero MR height position toward the direction opposite to the air bearing surface 30.

According to the embodiment, the end of the center portion $8b_1$ of the second portion $8b$ of the bottom pole layer 8 opposite to the air bearing surface 30 has the shape of a straight line parallel to the air bearing surface 30. As a result, it is possible to precisely control the throat height and the zero throat height position. In addition, the length of each of the side portions $8b_2$ and $8b_3$ of the second portion $8b$ between the end located in the air bearing surface 30 and the other end is greater than the length of the center portion $8b_1$, except the interface between the center portion $8b_1$ and each of the side portions $8b_2$ and $8b_3$. As a result, the volume of the second portion $8b$ and the areas of the first portion $8a$ and the second portion $8b$ touching each other are made greater, compared to the case in which the entire second portion $8b$ has a constant length. It is thereby possible to prevent a magnetic flux from saturating in the portion connecting the first portion $8a$ to the second portion $8b$ even when the throat height is small.

According to the embodiment, the width of the second portion 13D gradually decreases toward the air bearing surface 30. It is thereby possible to prevent a magnetic flux from saturating in the top pole layer 13.

The remainder of the configuration, functions and effects of the embodiment are similar to those of the first embodiment.

[Fifth Embodiment]

Figure 13:
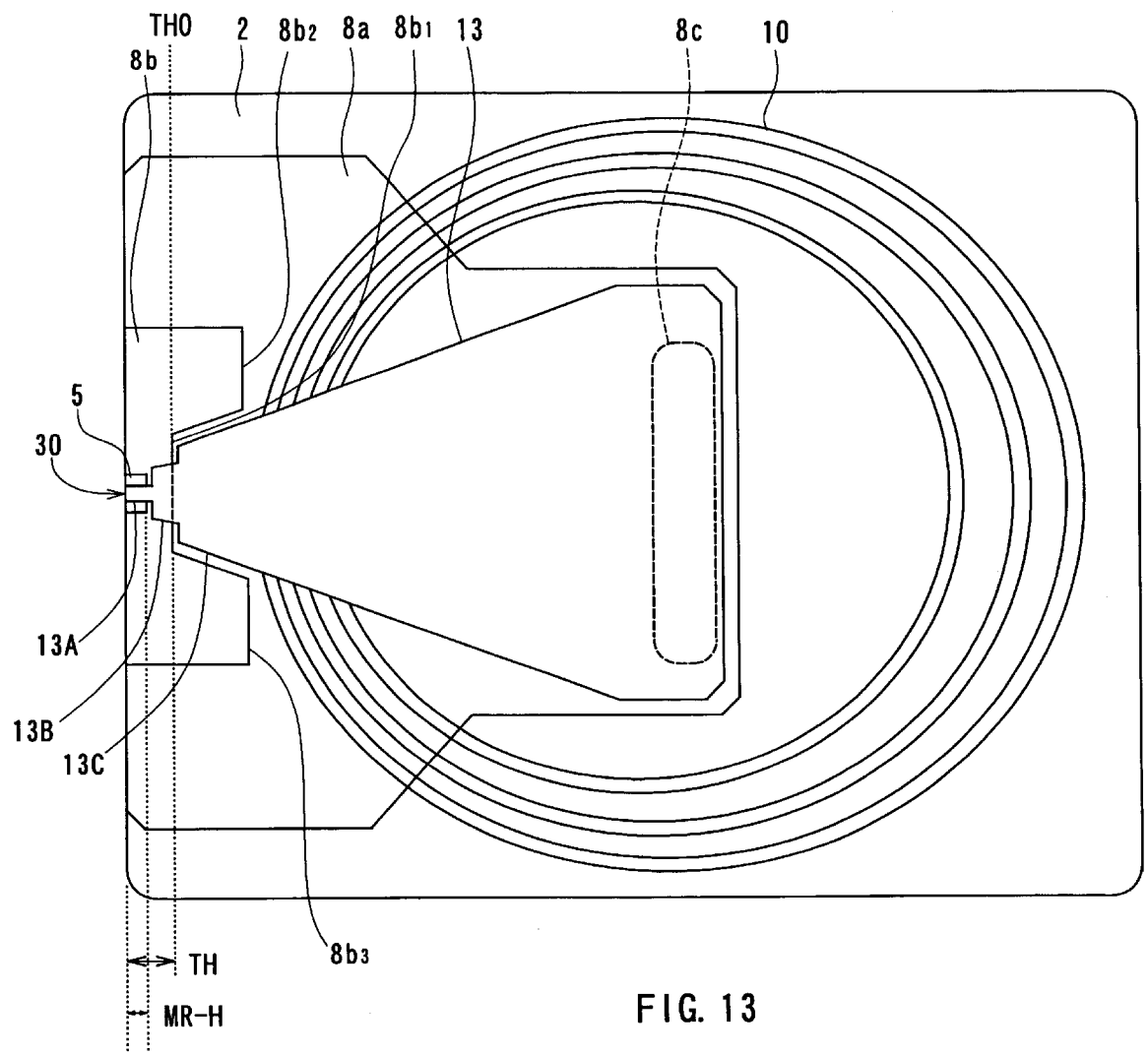
FIG. 13 is a top view of a thin-film magnetic head of a fifth embodiment of the invention.

Reference is now made to FIG. 13 to describe a thin-film magnetic head and a method of manufacturing the same of a fifth embodiment of the invention. FIG. 13 is a top view of the main part of the thin-film magnetic head of the embodiment, wherein an overcoat layer and the other insulating layers and films are omitted.

In the fifth embodiment the second portion $8b$ of the bottom pole layer 8 has: the center portion $8b_1$ that faces toward the top pole layer 13 and defines the throat height; and the side portions $8b_2$ and $8b_3$ placed at ends of the width of the center portion $8b_1$. An end of the center portion $8b_1$ opposite to the air bearing surface 30 has the shape of a straight line parallel to the air bearing surface 30, and is located at zero throat height position TH0. The length of each of the side portions $8b_2$ and $8b_3$ between an end located in the air bearing surface 30 and the other end is equal to the throat height at the interface between the center portion $8b_1$ and each of the side portions $8b_2$ and $8b_3$. The length increases as the distance from the interface becomes greater, and finally becomes constant. The portion of each of the side portions $8b_2$ and $8b_3$ having the varying width between the end located in the air bearing surface 30 and the other end has the end opposite to the air bearing surface 30 located along each of the ends of the third portion 13C of the top pole layer 13 located at each end of the width of the third portion 13C.

According to the embodiment, the end of the center portion $8b_1$ of the second portion $8b$ of the bottom pole layer 8 opposite to the air bearing surface 30 has the shape of a straight line parallel to the air bearing surface 30. As a result, it is possible to precisely control the throat height and the zero throat height position. In addition, the length of each of the side portions $8b_2$ and $8b_3$ of the second portion $8b$ between the end located in the air bearing surface 30 and the other end is greater than the length of the center portion $8b_1$, except the interface between the center portion $8b_1$ and each of the side portions $8b_2$ and $8b_3$. As a result, the volume of the second portion $8b$ and the areas of the first portion $8a$ and the second portion $8b$ touching each other are made greater, compared to the case in which the entire second portion $8b$ has a constant length. It is thereby possible to prevent a magnetic flux from saturating in the portion connecting the first portion $8a$ to the second portion $8b$ even when the throat height is small.

The remainder of the configuration, functions and effects of the embodiment are similar to those of the first embodiment.

[Sixth Embodiment]

Reference is now made to FIG. 14A to FIG. 19A, FIG. 14B to FIG. 19B, and FIG. 20 to describe a thin-film magnetic head and a method of manufacturing the same of a sixth embodiment of the invention. FIG. 14A to FIG. 19A are cross sections each orthogonal to an air bearing surface. FIG. 14B to FIG. 19B are cross sections of the pole portion each parallel to the air bearing surface.

In the manufacturing method, as shown in FIG. 14A and FIG. 14B, the insulating layer 2 made of alumina ($Al_2O_3$), for example, whose thickness is about 5 µm, is deposited on the substrate 1 made of aluminum oxide and titanium carbide ($Al_2O_3$—TiC), for example. On the insulating layer 2 the bottom shield layer 3 made of a magnetic material such as Permalloy and having a thickness of about 3 µm is selectively formed for making a reproducing head. Next, although not shown, an insulating layer of alumina, for example, having a thickness of 4 to 5 µm, for example, is formed over the entire surface. This insulating layer is polished through CMP, for example, so that the bottom shield layer 3 is exposed, and the surface is flattened.

Next, as shown in FIG. 15A and FIG. 15B, on the bottom shield layer 3, the bottom shield gap film 4 having a thickness of about 20 to 40 nm, for example, is formed as an insulating film. On the bottom shield gap film 4, the MR element 5 for reproduction having a thickness of tens of nanometers is formed. Next, on the bottom shield gap film 4, a pair of electrode layers 6 having a thickness of tens of nanometers are formed. The electrode layers 6 are electrically connected to the MR element 5. Next, the top shield gap film 7 having a thickness of about 20 to 40 nm, for example, is formed as an insulating film on the bottom shield gap film 4 and the MR element 5. The MR element 5 is embedded in the shield gap films 4 and 7.

Next, on the top shield gap film 7, the first portion 8a of the bottom pole layer 8 having a thickness of about 1.0 to 2.0 µm is selectively formed. The first portion 8a is made of a magnetic material and placed in a region facing toward at least a part of a thin-film coil described later.

Next, as shown in FIG. 16A and FIG. 16B, the second portion 8b and the third portion 8c of the bottom pole layer 8, each having a thickness of about 1.5 to 2.5 µm, are formed on the first portion 8a. The second portion 8b makes up a pole portion of the bottom pole layer 8 and is connected to a surface of the first portion 8a that faces toward the thin-film coil. The third portion 8c is provided for connecting the first portion 8a to a top pole layer described later. The throat height is defined by the position of an end of a portion of the second portion 8b opposite to the air bearing surface 30. This portion of the second portion 8b faces toward the top pole layer. That is, the position of the end of this portion of the second portion 8b is the zero throat height position.

Next, the insulating film 9 of alumina, for example, is formed over the entire surface. The thickness of the insulating film 9 is about 0.3 to 0.6 µm.

Next, a photoresist is patterned through a photolithography process to form the frame 19 for making the thin-film coil through frame plating. Next, a first layer 31 of the thin-film coil made of copper, for example, is formed by frame plating through the use of the frame 19. For example, the thickness of the first layer 31 is about 1.0 to 2.0 µm and the pitch is 1.2 to 2.0 µm. The frame 19 is then removed. In the drawings numeral 31a indicates a portion for connecting the first layer 31 to a second layer of the coil described later.

Figures 17A, 17B:
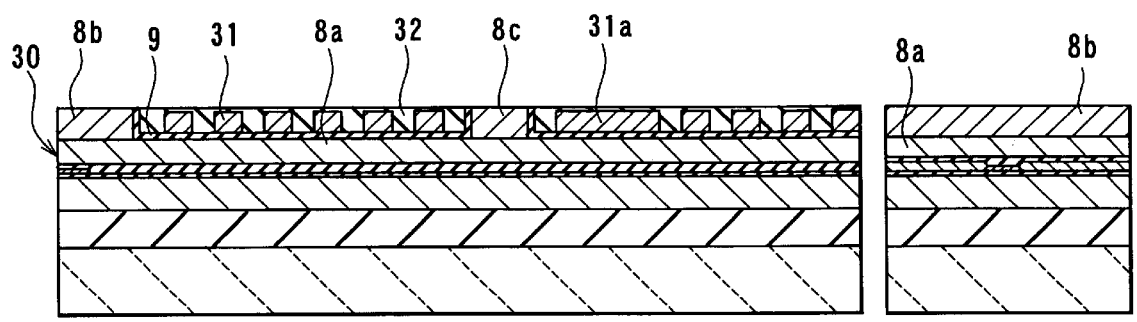
FIG. 17A and FIG. 17B are cross sections for illustrating a step that follows FIG. 16A and FIG. 16B.

Next, as shown in FIG. 17A and FIG. 17B, the insulating layer 32 of alumina, for example, having a thickness of about 3 to 4 µm is formed over the entire surface. The insulating layer 32 is then polished through CMP, for example, until the second portion 8b and the third portion 8c of the bottom pole layer 8 are exposed, and the surface is flattened. Although the first layer 31 of the coil is not exposed in FIG. 17A and FIG. 17B, the first layer 31 may be exposed.

Figures 18A, 18B:
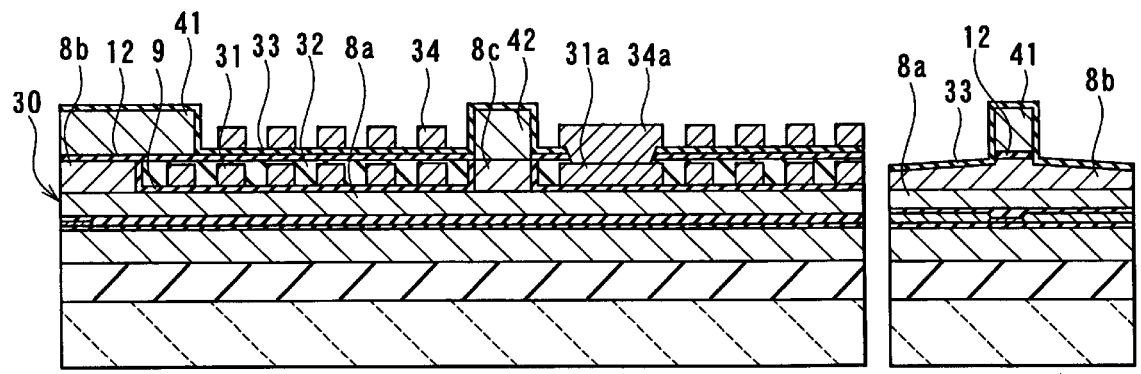
FIG. 18A and FIG. 18B are cross sections for illustrating a step that follows FIG. 17A and FIG. 17B.

Next, as shown in FIG. 18A and FIG. 18B, the recording gap layer 12 made of an insulating material whose thickness is 0.2 to 0.3 µm, for example, is formed on the second portion 8b and the third portion 8c of the bottom pole layer 8 exposed and the insulating layer 32. Next, a portion of the recording gap layer 12 located on top of the third portion 8c is etched to form a contact hole for making the magnetic path.

Next, on the recording gap layer 12, a pole portion layer 41 having a thickness of 2 to 3 µm, for example, is formed. The pole portion layer 41 includes a pole portion of the top pole layer that defines the recording track width. In addition, a magnetic layer 42 having a thickness of 2 to 3 µm is formed in the contact hole provided in the portion on top of the third portion 8c of the bottom pole layer 8. The magnetic layer 42 is provided for connecting the bottom pole layer 8 to a yoke portion layer of the top pole layer described later. In this embodiment the length of the pole portion layer 41 of the top pole layer between an end located in the air bearing surface 30 and the other end is greater than the length of the MR element 5 between an end located in the air bearing surface 30 and the other end. Furthermore, this length of the pole portion layer 41 is equal to or greater than the length of the portion of the second portion 8b of the bottom pole layer 8 that defines the throat height, the length between an end located in the air bearing surface 30 and the other end.

The pole portion layer 41 and the magnetic layer 42 of the top pole layer may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, the recording gap layer 12 is selectively etched through dry etching, using the pole portion layer 41 as a mask. The dry etching may be reactive ion etching (RIE) using a chlorine-base gas such as $BCl_2$ or $Cl_2$, or a fluorine-base gas such as $CF_4$ or $SF_6$, for example. Next, the second portion 8b of the bottom pole layer 8 is selectively etched by about 0.3 to 0.6 µm through argon ion milling, for example. A trim structure as shown in FIG. 18B is thus formed.

Next, an insulating film 33 of alumina, for example, having a thickness of about 0.3 to 0.6 µm is formed over the entire surface. Next, portions of the insulating film 33, the recording gap layer 12 and the insulating layer 32 located on top of the connection portion 31a are etched to form a contact hole. Next, a second layer 34 of the thin-film coil made of copper, for example, is formed by frame plating. For example, the thickness of the second layer 34 is about 1.0 to 2.0 µm and the pitch is 1.2 to 2.0 µm. In the drawings numeral 34a indicates a portion for connecting the second layer 34 to the first layer 31 of the coil through the above-mentioned contact hole.

Figures 19A, 19B:
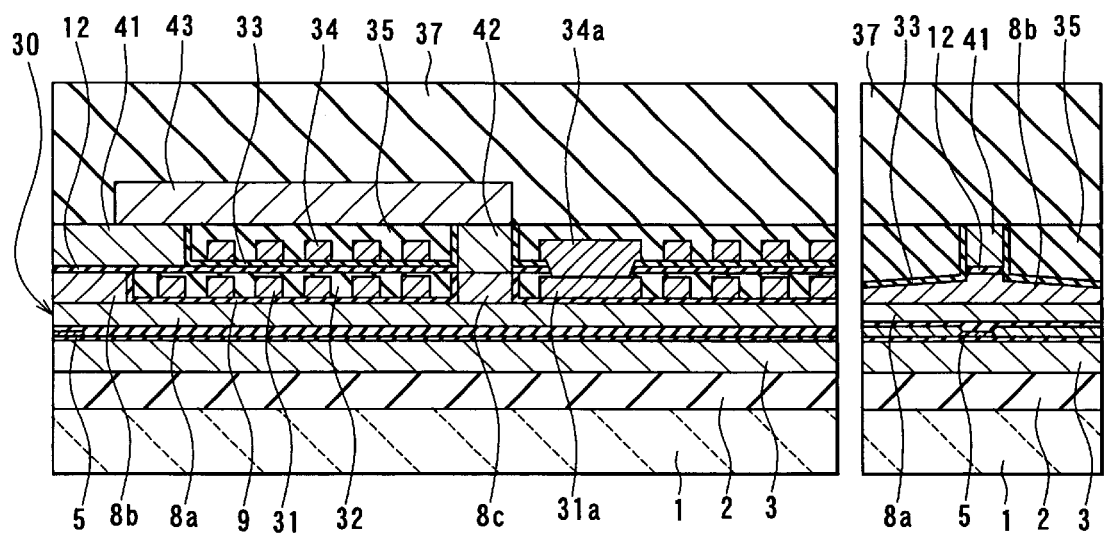
FIG. 19A and FIG. 19B are cross sections of the thin-film magnetic head of the sixth embodiment.

Next, as shown in FIG. 19A and FIG. 19B, an insulating layer 35 of alumina, for example, having a thickness of about 3 to 4 µm is formed over the entire surface. The insulating layer 35 is then polished through CMP, for example, so that the pole portion layer 41 and the magnetic layer 42 of the top pole layer are exposed, and the surface is flattened. Although the second layer 34 is not exposed in FIG. 19A and FIG. 19B, the second layer 34 may be exposed. If the second layer 34 is exposed, another insulating layer is formed to cover the second layer 34 and the insulating layer 35.

Next, a yoke portion layer 43 having a thickness of about 2 to 3 µm, for example, is formed on the pole portion layer 41 and the magnetic layer 42 of the top pole layer flattened and the insulating layer 35. The yoke portion layer 43 provided for the recording head is made of a magnetic material and forms a yoke portion of the top pole layer. The yoke portion layer 43 is in contact and magnetically coupled to the third portion 8c of the bottom pole layer 8 through the magnetic layer 42. The yoke portion layer 43 may be made of NiFe (80 weight % Ni and 20 weight % Fe), or NiFe (45 weight % Ni and 55 weight % Fe) as a high saturation flux density material and formed through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the yoke portion layer 43 may be made of a number of layers of inorganic insulating films and magnetic layers of Permalloy, for example.

In this embodiment an end face of the yoke portion layer 43 facing toward the air bearing surface 30 is located at a distance from the air bearing surface 30 (that is, on the right side of FIG. 19A). In this embodiment, in particular, the distance between the air bearing surface 30 and the end of the yoke portion layer 43 facing toward the air bearing surface 30 is equal to or greater than the length of the MR element 5 between an end thereof located in the air bearing surface 30 and the other end.

Next, an overcoat layer 37 of alumina, for example, having a thickness of 20 to 40 μm is formed over the entire surface. The surface of the overcoat layer 37 is then flattened and pads (not shown) for electrodes are formed on the overcoat layer 37. Finally, lapping of the slider is performed to form the air bearing surface 30 of the thin-film magnetic head including the recording head and the reproducing head. The thin-film magnetic head of the embodiment is thus completed.

In this embodiment the top pole layer made up of the pole portion layer 41, the magnetic layer 42 and the yoke portion layer 43 corresponds to the second magnetic layer of the invention.

Figure 20:
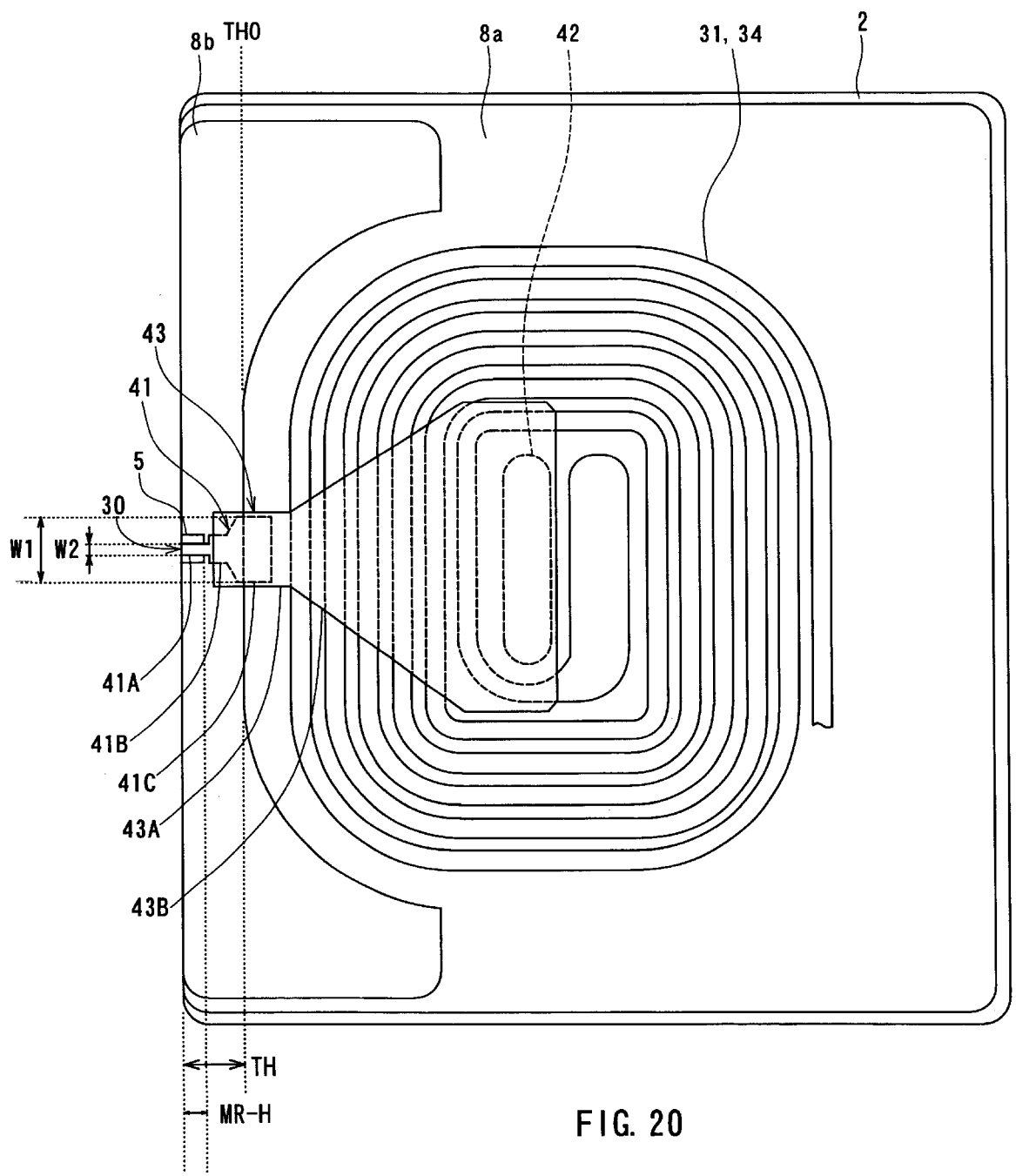
FIG. 20 is a top view of the thin-film magnetic head of the sixth embodiment.

FIG. 20 is a top view of the main part of the thin-film magnetic head of the embodiment, wherein the overcoat layer and the other insulating layers and films are omitted. In FIG. 20 'TH' indicates the throat height, 'TH0' indicates the zero throat height position, and 'MR-H' indicates the MR height.

In this embodiment the bottom pole layer 8 includes: the first portion 8a located in the region facing toward the first layer 31 of the thin-film coil; and the second portion 8b connected to a surface of the first portion 8a that faces toward the first layer 31 of the coil. The second portion 8b forms the pole portion and a portion of the second portion 8b defines the throat height. The first layer 31 of the coil is located on a side of the second portion 8b. In this embodiment throat height TH is the length of the portion of the second portion 8b that defines the throat height, the length between an end of the portion located in the air bearing surface 30 and the other end. (This length may be simply called the length of the second portion 8b in the following description.) As in the first embodiment, throat height TH is greater than MR height MR-H, that is, the length of the MR element 5 between an end thereof located in the air bearing surface 30 and the other end. The length of the second portion 8b is preferably 150 to 600 percent of MR height MR-H, and more preferably 300 to 500 percent. In other words, if MR height MRH is 0.5 μm, for example, the length of the second portion 8b is preferably 0.75 to 3.0 μm, and more preferably 1.5 to 2.5 μm.

In the embodiment the track width is defined by the pole portion layer 41 of the top pole layer. As shown in FIG. 20, the pole portion layer 41 has a first portion 41A, a second portion 41B and a third portion 41C in the order in which the closest to the air bearing surface 30 comes first. The first portion 41A has a width equal to the recording track width. The second portion 41B is greater than the first portion 41A in width. The width of the third portion 41C is equal to the width of the second portion 41B at the interface between the third portion 41C and the second portion 41B. The width of the third portion 41C increases from this interface with an increase in the distance from the air bearing surface 30, and the width finally becomes constant.

The pole portion layer 41 has edges linking lateral edges of the first portion 41A orthogonal to the air bearing surface 30 to lateral edges of the second portion 41B orthogonal to the air bearing surface 30. These edges linking the lateral edges of the first portion 41A to the lateral edges of the second portion 41B are parallel to the air bearing surface 30.

In the pole portion layer 41 the interface between the first portion 41A and the second portion 41B is located near the zero MR height position.

In the pole portion layer 41 the interface between the second portion 41B and the third portion 41C is located closer to the air bearing surface 30 than zero throat height position TH0, that is, the position of an end of the portion of the second portion 8b that faces toward the pole portion layer 41, the end opposite to the air bearing surface 30. As a result, in this embodiment, width W1 of the pole portion layer 41 at zero throat height position TH0 is greater than recording track width W2, that is, the width of the first portion 41A.

The yoke portion layer 43 of the top pole layer has a first portion 43A and a second portion 43B in the order in which the closest to the air bearing surface 30 comes first. The first portion 43A has a width nearly equal to the greatest width of the third portion 41C of the pole portion layer 41. The width of the second portion 43B is equal to the width of the first portion 43A at the interface between the first portion 43A and the second portion 43B. The width of the second portion 43B increases from this interface with an increase in the distance from the air bearing surface 30, and the width finally becomes constant. The first portion 43A is located so as to nearly overlay the second portion 41B and the third portion 41C of the pole portion layer 41.

According to the embodiment thus described, the throat height is defined by the second portion 8b of the bottom pole layer 8. The first layer 31 of the thin-film coil is located on the first portion 8a of the bottom pole layer 8 and on a side of the second portion 8b. The top surface of the insulating layer 32 covering the first layer 31 is flattened, together with the top surface of the second portion 8b. In addition, the top pole layer is divided into the pole portion layer 41 and the yoke portion layer 43. As a result, the pole portion layer 41 of the top pole layer that defines the recording track width is formed on the flat surface. Therefore, according to the embodiment, it is possible to form the pole portion layer 41 with accuracy and to precisely control the recording track width even if the recording track width is reduced down to the half-micron or quarter-micron order.

According to the embodiment, the width of the pole portion layer 41 at the zero throat height position is greater than the recording track width. It is thereby possible to prevent a magnetic flux from saturating in the pole portion layer 41 in the neighborhood of the zero throat height position. In addition, the width of the pole portion layer 41 gradually decreases toward the air bearing surface 30. Therefore, it is impossible that the cross-sectional area of the magnetic path abruptly decreases. Saturation of a magnetic flux halfway through the magnetic path is thereby prevented. Furthermore, the width of the pole portion layer 41 at the zero throat height position is greater than the recording track width. As a result, the areas of the pole portion layer 41 and the yoke portion layer 43 touching each other are increased. It is thereby possible to prevent a magnetic flux from saturating in the portions of the pole portion layer 41 and the yoke portion layer 43 touching each other. According to the embodiment, it is thereby possible to utilize the magnetomotive force generated by the layers 31 and 34 of the coil for writing with efficiency and to improve the overwrite property.

According to the embodiment, the pole portion layer 41 that defines the recording track width is formed on the flat surface. As a result, it is possible to prevent an increase in the width of the first portion 41A that defines the recording track width when the width of the pole portion layer 41 at the zero throat height position is made greater than the recording track width as described above.

In the embodiment an end of the second portion 41B of the pole portion layer 41 on a side of the air bearing surface 30 is parallel to the air bearing surface 30. The first portion 41A of the pole portion layer 41 is connected to this end of the second portion 41B. Therefore, a photomask used for making the pole portion layer 41 through photolithography has a shape including a side corresponding to the end of the second portion 41B on the side of the air bearing surface 30 and an additional concave or convex portion corresponding to the first portion 41A. The pole portion layer 41 is formed on the flat surface through the use of the photomask in the above-described shape. It is thereby possible to precisely control the width of the first portion 41A, that is, the recording track width.

In the embodiment the second layer 34 of the thin-film coil is located on a side of the pole portion layer 41 of the top pole layer. The top surface of the insulating layer 35 covering the second layer 34 is flattened, together with the top surface of the pole portion layer 41. As a result, the yoke portion layer 43 of the top pole layer is formed on the flat surface, too. It is thereby possible to form the yoke portion layer 43 of small dimensions. So-called 'side write' and 'side erase' are thus prevented.

In the embodiment an end face of the yoke portion layer 43 facing toward the air bearing surface 30 is located at a distance from the air bearing surface 30. As a result, it is impossible that the yoke portion layer 43 is exposed from the air bearing surface 30 even if the throat height is low. Side write and side erase are thereby prevented.

According to the embodiment, the length of the pole portion layer 41 between an end thereof facing toward the air bearing surface 30 and the other end is greater than the MR height, that is, the length of the MR element 5 between the end thereof located in the air bearing surface 30 and the other end. In addition, the end face of the yoke portion layer 43 facing toward the air bearing surface 30 is located at a distance from the air bearing surface 30. Therefore, portions of the pole portion layer 41 and the yoke portion layer 43 touch each other in the region farther from the air bearing surface 30 than the zero throat height position, too. As a result, according to the embodiment, side write and side erase are prevented since the end face of the yoke portion layer 43 facing toward the air bearing surface 30 is located at a distance from the air bearing surface 30. At the same time, it is possible to prevent an abrupt decrease in the cross-sectional area of the magnetic path in the top pole layer and to prevent a magnetic flux from saturating halfway through the magnetic path.

In the embodiment the distance between the air bearing surface 30 and the end of the yoke portion layer 43 facing toward the air bearing surface 30 is equal to or greater than the MR height, that is, the length of the MR element 5 between an end thereof located in the air bearing surface 30 and the other end.

Figure 21:
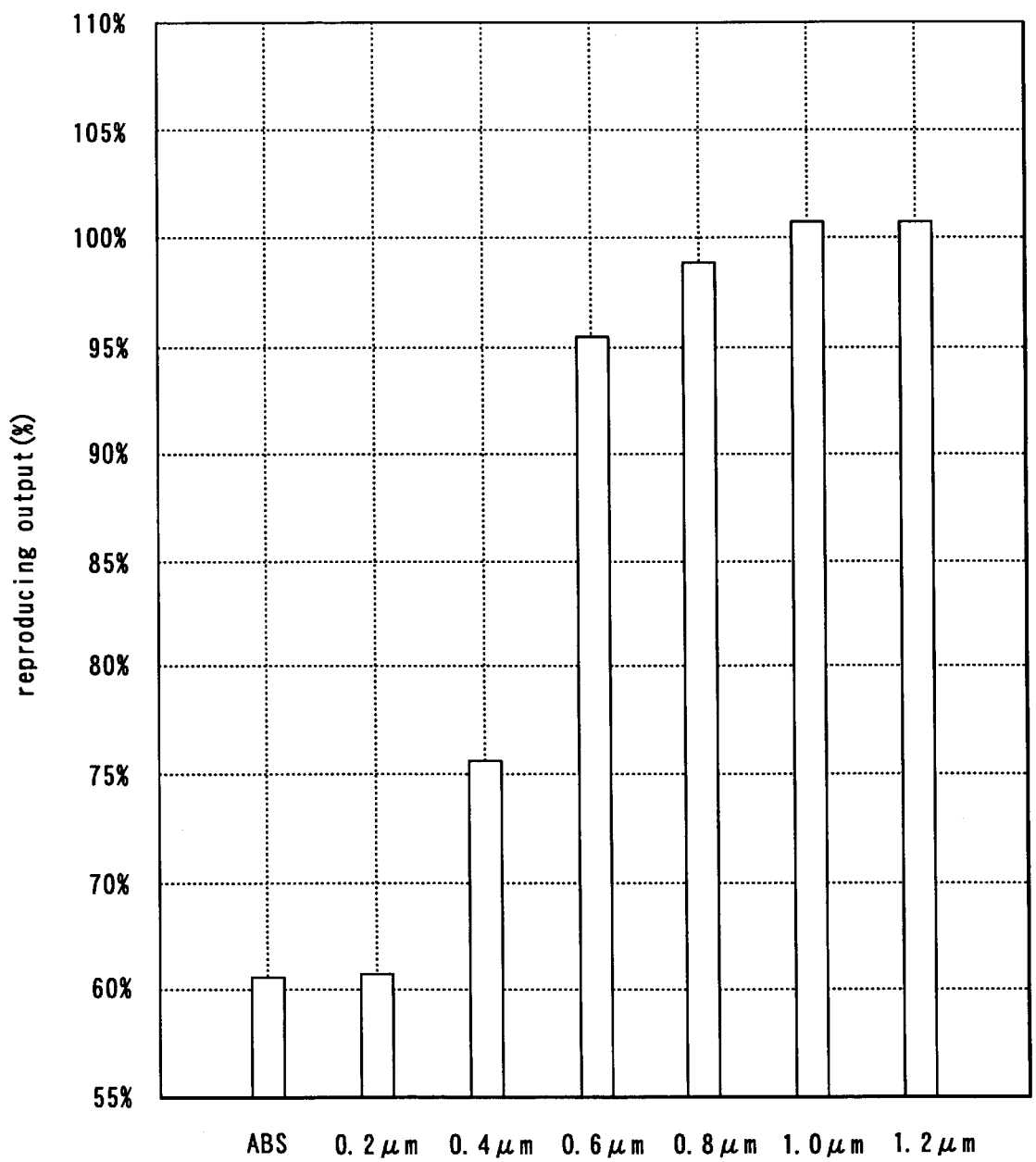
FIG. 21 is a plot for illustrating the relationship between the side erase property and the position of an end of a yoke portion layer facing toward an air bearing surface shown in FIG. 19A and FIG. 19B.

Reference is now made to FIG. 21 to describe a result of an experiment performed for determining the relationship between the side erase property and the position of the end of the yoke portion layer 43 facing toward the air bearing surface 30. Thin-film magnetic heads used for this experiment were of seven types in one of which the position of the end of the yoke portion layer 43 was located in the air bearing surface 30 (shown as ABS in FIG. 21). In the other six types the distance between the air bearing surface 30 and the end of the yoke portion layer 43 was 0.2 μm, 0.4 μm, 0.6 μm, 0.8 μm, 1.0 μm, and 1.2 μm, respectively. The MR height was 0.6 μm.

In the experiment the following procedure was performed for each of the thin-film magnetic heads. First, data was written by the head in a track of a recording medium. Next, the head was moved to a neighboring track where data was written 200 times. The head was then moved back to the track where the data had been first written. In this track the data was read and the reproducing output was obtained. The current supplied to the recording head when writing was performed was 50 mA. In FIG. 21 the reproducing output is expressed as a percentage of a desired reproducing output. A hundred percent means that there is no side erase. The smaller the reproducing output, the greater is the degree of side erase.

As shown in FIG. 21, it is noted that the reproducing output increases with an increase in the distance between the air bearing surface 30 and the end of the yoke portion layer 43. As a result, side erase is prevented more effectively. In addition, it is noted that almost no side erase occurs when the distance between the air bearing surface 30 and the end of the yoke portion layer 43 is equal to or greater than 0.6 μm, that is, the MR height. Both side erase and side write result from a magnetic flux leaking from the yoke portion layer 43, following the same principle. Therefore, the foregoing description similarly applies to the case of side write.

As thus described, it is possible to prevent side write and side erase more effectively when the distance between the air bearing surface 30 and the end of the yoke portion layer 43 facing toward the air bearing surface 30 is equal to or greater than the MR height.

According to the embodiment, the insulating film 33 made of an inorganic material is provided between the first layer 31 and the second layer 34 of the thin-film coil, in addition to the recording gap layer 12. High insulation strength is thereby obtained between the first layer 31 and the second layer 34 of the coil. In addition, it is possible to reduce flux leakage from the layers 31 and 34 of the coil.

The remainder of the configuration, functions and effects of the embodiment are similar to those of the first embodiment.

[Seventh Embodiment]

Figure 22:
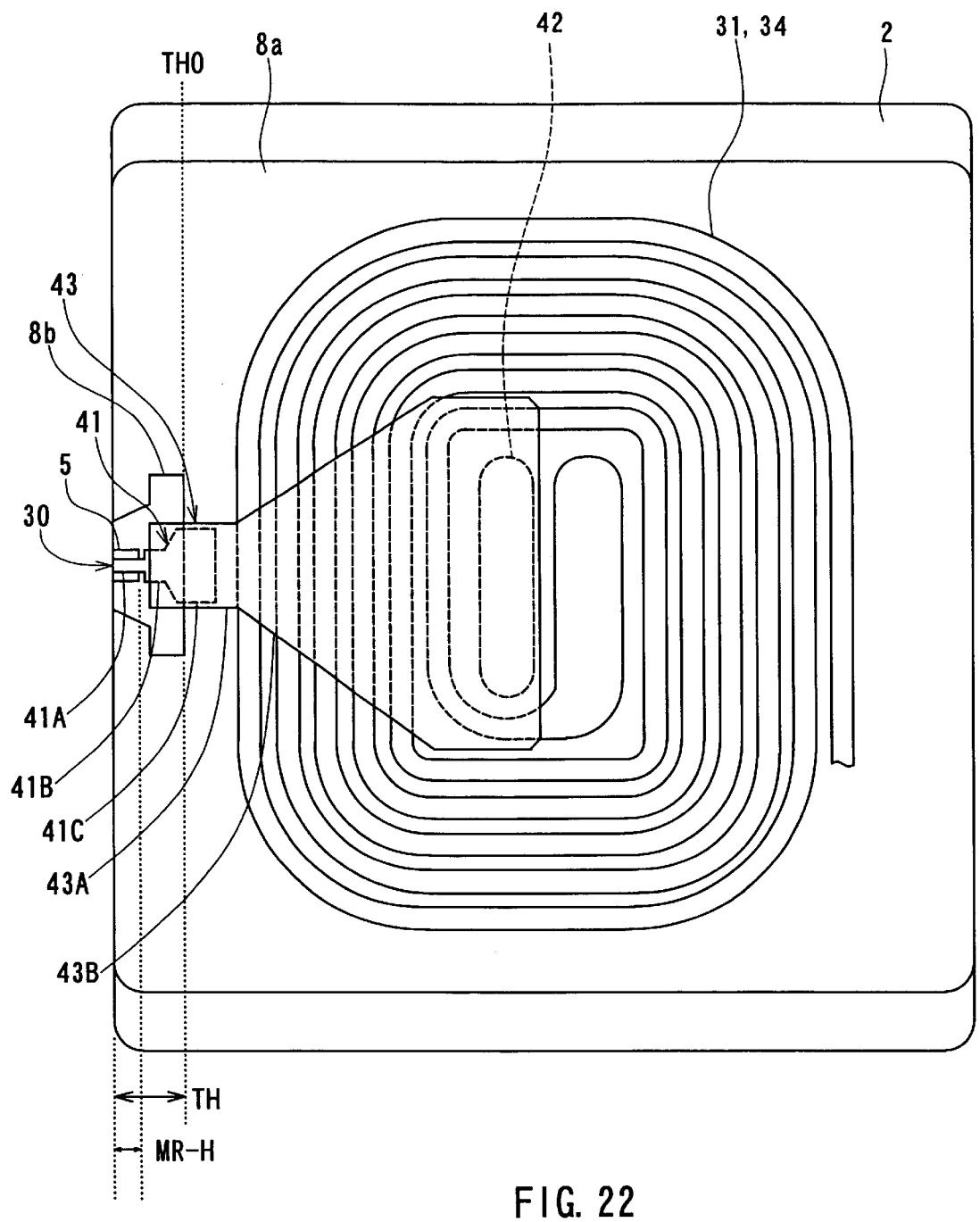
FIG. 22 is a top view of a thin-film magnetic head of a seventh embodiment of the invention.
Figures 25A, 25B:
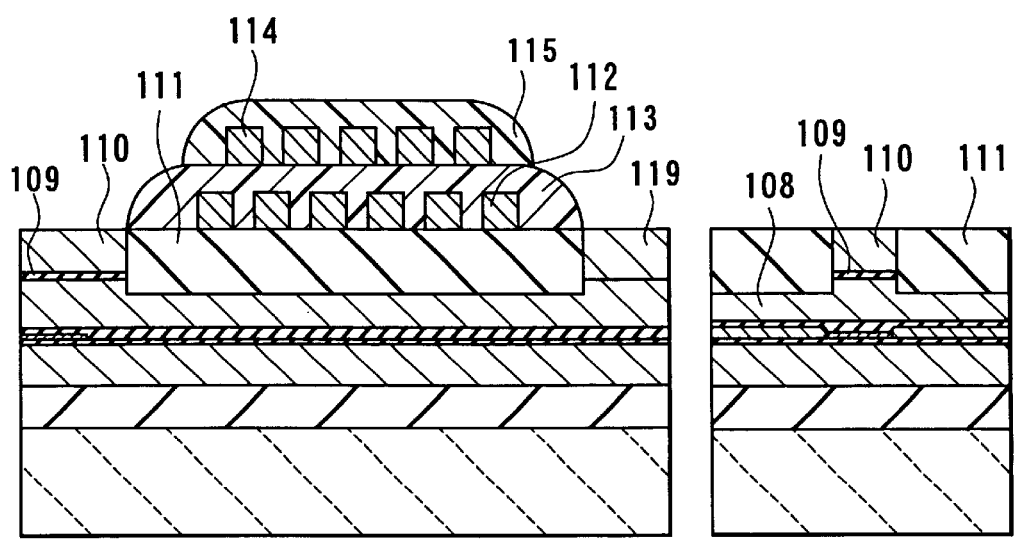
FIG. 25A and FIG. 25B are cross sections for illustrating a step that follows FIG. 24A and FIG. 24B.
Figures 26A, 26B:
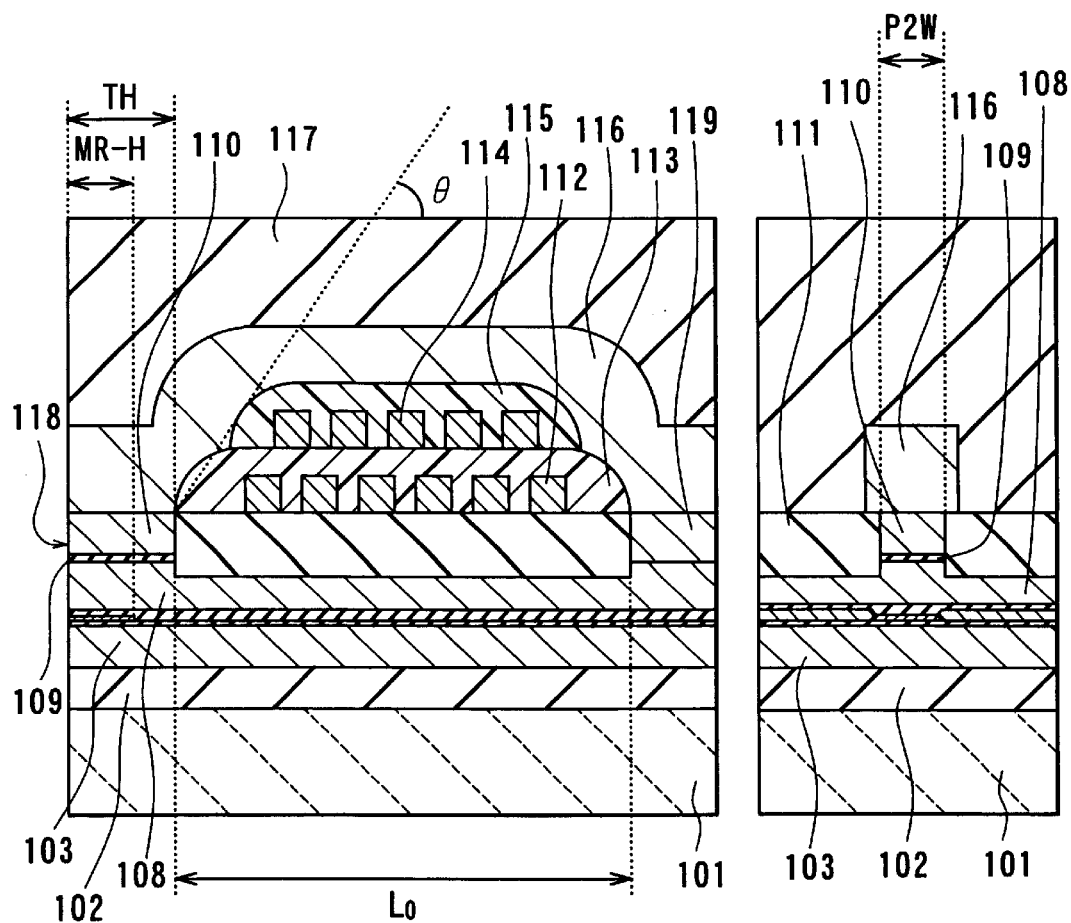
FIG. 26A and FIG. 26B are cross sections for illustrating a step that follows FIG. 25A and FIG. 25B.
Figure 27:
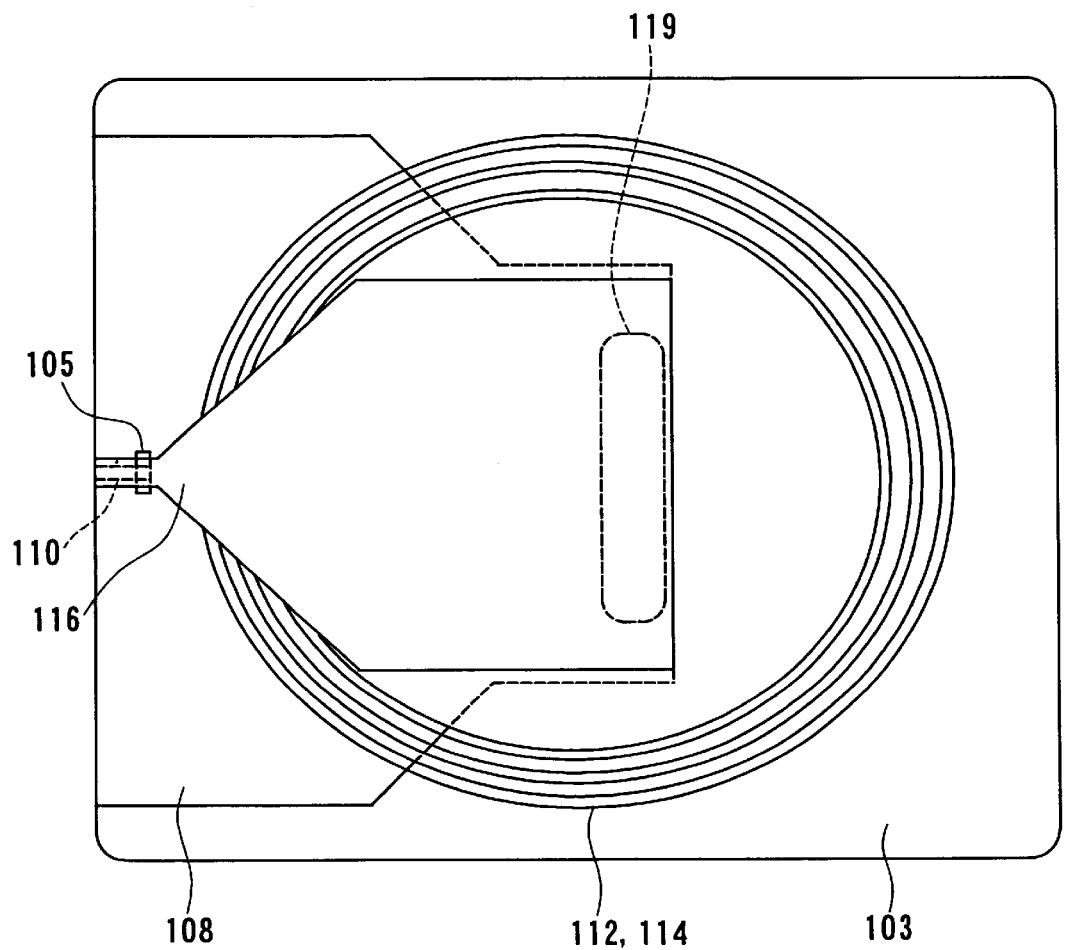
FIG. 27 is a top view of the related-art thin-film magnetic head.

Reference is now made to FIG. 22 to describe a thin-film magnetic head and a method of manufacturing the same of a seventh embodiment of the invention. FIG. 22 is a top view of the main part of the thin-film magnetic head of the embodiment, wherein an overcoat layer and the other insulating layers and films are omitted.

In the seventh embodiment the second portion 8b of the bottom pole layer 8 has a shape in which a portion closest to the air bearing surface 30 is smaller than the other portion in width. The width of this portion decreases toward the air bearing surface 30. An end of the second portion 8b opposite to the air bearing surface 30 has the shape of a straight line parallel to the air bearing surface 30, and is located at zero throat height position TH0.

According to the embodiment, since the second portion 8b has the geometry as described above, it is possible to reduce the width of the second portion 8b in the air bearing surface 30 and to prevent an increase in effective track width. In addition, the width of the second portion 8b gradually decreases toward the air bearing surface 30. It is thereby possible to prevent a magnetic flux from saturating in the bottom pole layer 8. Furthermore, it is possible to precisely control the throat height and the zero throat height position since the end of the second portion 8b opposite to the air bearing surface 30 has the shape of a straight line parallel to the air bearing surface 30.

The remainder of the configuration, functions and effects of the embodiment are similar to those of the sixth embodiment.

The present invention is not limited to the foregoing embodiments but may be practiced in still other ways. In the foregoing embodiments, for example, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

According to the first thin-film magnetic head or the first method of the invention thus described, the throat height is defined by the second portion of the first magnetic layer. At least a part of the thin-film coil is located on a side of the second portion of the first magnetic layer. The track width is defined by the second magnetic layer. As a result, the second magnetic layer is formed on the flat surface with accuracy. It is thereby possible to precisely control the track width as well as to prevent saturation of a magnetic flux in the second magnetic layer. According to the invention, an end of at least a part of the thin-film coil is located near an end of the second portion of the first magnetic layer. It is thereby possible to reduce the yoke length. According to the invention, the portion of the second portion of the first magnetic layer that defines the throat height has the length between an end thereof located in the medium facing surface and the other end, the length being greater than the length of the magnetoresistive element between an end thereof located in the medium facing surface and the other end. As a result, it is possible to prevent saturation of a magnetic flux in the first magnetic layer. Since the invention has the foregoing features, it is possible to precisely control the track width and to prevent a magnetic flux from saturating halfway through the magnetic path even when the track width of the recording head is reduced. In addition, a reduction in yoke length is achieved.

According to the first thin-film magnetic head or the first method of the invention, a width of the second magnetic layer measured in a position corresponding to the other end of the portion of the second portion of the first magnetic layer may be greater than a width of the second magnetic layer measured in the medium facing surface. In this case, it is possible to prevent a magnetic flux from saturating in the second magnetic layer, in particular.

According to the first thin-film magnetic head or the first method of the invention, the second magnetic layer may include: a portion having a width equal to the track width and located closer to the medium facing surface than the other portion of the second magnetic layer; and the other portion having a width greater than the track width, the width of the other portion decreasing toward the medium facing surface. In this case, in particular, it is impossible that the cross-sectional area of the magnetic path in the second magnetic layer abruptly decreases. It is therefore possible to prevent a magnetic flux from saturating halfway through the magnetic path.

According to the first thin-film magnetic head or the first method, an insulating layer may be further provided. The insulating layer covers the at least part of the thin-film coil located on the side of the second portion of the first magnetic layer. A surface of the insulating layer facing toward the second magnetic layer is flattened together with a surface of the second portion facing toward the second magnetic layer. In this case, in particular, the second magnetic layer is formed on the flat surface with accuracy.

According to the first thin-film magnetic head or the first method, the second magnetic layer may include the pole portion layer and the yoke portion layer forming the yoke portion. In addition, an end face of the yoke portion layer facing toward the medium facing surface may be located at a distance from the medium facing surface. In this case, it is possible to prevent writing of data in a region where data is not supposed to be written and erasing of data where data is not supposed to be written.

According to the first thin-film magnetic head or the first method, the pole portion layer may have a length between an end thereof located in the medium facing surface and the other end, the length being greater than the length of the magnetoresistive element between the end thereof located in the medium facing surface and the other end. In addition, the distance between the medium facing surface and the end face of the yoke portion layer facing toward the medium facing surface may be equal to or greater than the length of the magnetoresistive element. In this case, it is possible to more effectively prevent writing of data in a region where data is not supposed to be written and erasing of data where data is not supposed to be written.

According to the first thin-film magnetic head or the first method, the thin-film coil may include: the first layer located on a side of the second portion of the first magnetic layer; and the second layer located on a side of the pole portion layer of the second magnetic layer. In addition, the first insulating layer and the second insulating layer may be further provided. The first insulating layer covers the first layer of the coil and has a surface facing toward the second magnetic layer, the surface being flattened together with a surface of the second portion of the first magnetic layer facing toward the second magnetic layer. The second insulating layer covers the second layer of the coil and has a surface facing toward the yoke portion layer, the surface being flattened together with a surface of the pole portion layer of the second magnetic layer facing toward the yoke portion layer. In this case, it is possible to form the yoke portion layer of the second magnetic layer with accuracy.

According to the first thin-film magnetic head or the first method, the end of the portion of the second portion of the first magnetic layer that defines the throat height, the end being opposite to the medium facing surface, may have a shape of a straight line parallel to the medium facing surface. In this case, it is possible to define the throat height with more accuracy.

According to the first thin-film magnetic head or the first method, the second portion of the first magnetic layer may include a portion located closer to the medium facing surface than the other part of the second portion, the portion having a width smaller than a width of the other part of the second portion. In this case, it is possible to prevent an increase in effective track width.

According to the first thin-film magnetic head or the first method, the second portion of the first magnetic layer may include: the center portion facing the second magnetic layer and defining the throat height; and the side portions formed at both ends of a width of the center portion. At least a part of the side portions has a length between an end thereof located in the medium facing surface and the other end, the length being greater than the throat height. In this case, it is possible to prevent a magnetic flux from saturating in the portion connecting the first and second portions of the first magnetic layer to each other even when the throat height is low.

According to the second thin-film magnetic head or the second method of the invention, the second magnetic layer is divided into the pole portion layer and the yoke portion layer. It is thereby possible to precisely control the track width even when the track width of the recording head is reduced. According to the invention, the pole portion layer has the length between an end thereof located in the medium facing surface and the other end, the length being greater than the length of the magnetoresistive element between an end thereof located in the medium facing surface and the other end. An end face of the yoke portion layer facing toward the medium facing surface is located at a distance from the medium facing surface, the distance between the medium facing surface and the end face of the yoke portion layer being equal to or greater than the length of the magnetoresistive element. As a result, it is possible to prevent a magnetic flux from saturating halfway through the magnetic path and to prevent writing of data in a region where data is not supposed to be written and erasing of data where data is not supposed to be written.

According to the second thin-film magnetic head or the second method of the invention, the first magnetic layer may include: the first portion located in a region facing toward the at least part of the thin-film coil, and the second portion connected to a surface of the first portion facing toward the thin-film coil, the second portion including a portion that forms one of the pole portions and defines a throat height. In addition, the at least part of the thin-film coil may be located on a side of the second portion of the first magnetic layer. In this case, an end of the at least part of the coil is located near an end of the second portion of the first magnetic layer. It is thereby possible to reduce the yoke length.

According to the second thin-film magnetic head or the second method, the thin-film coil may include: the first layer located on a side of the second portion of the first magnetic layer; and the second layer located on a side of the pole portion layer of the second magnetic layer. In addition, the first insulating layer and the second insulating layer may be further provided. The first insulating layer covers the first layer of the coil and has a surface facing toward the second magnetic layer, the surface being flattened together with a surface of the second portion of the first magnetic layer facing toward the second magnetic layer. The second insulating layer covers the second layer of the coil and has a surface facing toward the yoke portion layer, the surface being flattened together with a surface of the pole portion layer of the second magnetic layer facing toward the yoke portion layer. In this case, it is possible to form the yoke portion layer of the second magnetic layer with more accuracy.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
    a medium facing surface that faces toward a recording medium;
    a reproducing head including: a magnetoresistive element; and a first shield layer and a second shield layer for shielding the magnetoresistive element, portions of the shield layers located on a side of the medium facing surface being opposed to each other with the magnetoresistive element in between; and
    a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; wherein:
    the first magnetic layer includes: a first portion located in a region facing toward the at least part of the thin-film coil; and a second portion connected to a surface of the first portion facing toward the thin-film coil, the second portion including a portion that forms one of the pole portions and defines a throat height;
    the portion of the second portion of the first magnetic layer that defines the throat height has a length between an end thereof located in the medium facing surface and the other end, the length being greater than a length of the magnetoresistive element between an end thereof located in the medium facing surface and the other end;
    the at least part of the thin-film coil is located on a side of the second portion of the first magnetic layer; and
    the second magnetic layer defines a track width; and
    wherein a width of the second magnetic layer measured in a position corresponding to the other end of the portion of the second portion of the first magnetic layer is greater than a width of the second magnetic layer measured in the medium facing surface.

2. The thin-film magnetic head according to claim 1 wherein the second magnetic layer includes: a portion having a width equal to the track width and located closer to the medium facing surface than the other portion of the second magnetic layer; and the other portion having a width greater than the track width, the width of the other portion decreasing toward the medium facing surface.

3. A thin-film magnetic head comprising:
    a medium facing surface that faces toward a recording medium;
    a reproducing head including: a magnetoresistive element; and a first shield layer and a second shield layer for shielding the magnetoresistive element, portions of the shield layers located on a side of the medium facing surface being opposed to each other with the magnetoresistive element in between; and
    a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; wherein:
    the first magnetic layer includes: a first portion located in a region facing toward the at least part of the thin-film coil; and a second portion connected to a surface of the first portion facing toward the thin-film coil, the second portion including a portion that forms one of the pole portions and defines a throat height;

the portion of the second portion of the first magnetic layer that defines the throat height has a length between an end thereof located in the medium facing surface and the other end, the length being greater than a length of the magnetoresistive element between an end thereof located in the medium facing surface and the other end;

the at least part of the thin-film coil is located on a side of the second portion of the first magnetic layer; and the second magnetic layer defines a track width; and wherein the portion of the second portion of the first magnetic layer that defines the throat height has the length between the end thereof located in the medium facing surface and the other end, the length being 150 to 600 percent of the length of the magnetoresistive element between the end thereof located in the medium facing surface and the other end.

4. A thin-film magnetic head comprising:

a medium facing surface that faces toward a recording medium;

a reproducing head including: a magnetoresistive element; and a first shield layer and a second shield layer for shielding the magnetoresistive element, portions of the shield layers located on a side of the medium facing surface being opposed to each other with the magnetoresistive element in between; and a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers; wherein:

the first magnetic layer includes: a first portion located in a region facing toward the at least part of the thin-film coil; and a second portion connected to a surface of the first portion facing toward the thin-film coil, the second portion including a portion that forms one of the pole portions and defines a throat height;

the portion of the second portion of the first magnetic layer that defines the throat height has a length between an end thereof located in the medium facing surface and the other end, the length being greater than a length of the magnetoresistive element between an end thereof located in the medium facing surface and the other end;

the at least part of the thin-film coil is located on a side of the second portion of the first magnetic layer; and the second magnetic layer defines a track width; and wherein the portion of the second portion of the first magnetic layer that defines the throat height has the length between the end thereof located in the medium facing surface and the other end, the length being 300 to 500 percent of the length of the magnetoresistive element between the end thereof located in the medium facing surface and the other end.

* * * * *

UNITED STATES PATENT AND TRADEMARK OFFICE
CERTIFICATE OF CORRECTION

PATENT NO. : 6,826,012 B1 Page 1 of 1
DATED : November 30, 2004
INVENTOR(S) : Yoshitaka Sasaki It is certified that error appears in the above-identified patent and that said Letters Patent is hereby corrected as shown below:

Column 14,
Line 10, replace "head, of" with -- head of --.

Column 15,
Line 18, replace "MRH" with -- MR-H --.

Column 23,
Line 43, replace "MRH" with -- MR-H --.

Signed and Sealed this

Twenty-second Day of March, 2005

JON W. DUDAS
*Director of the United States Patent and Trademark Office*